(12) United States Patent
Kimura et al.

(10) Patent No.: US 11,314,064 B2
(45) Date of Patent: Apr. 26, 2022

(54) ZOOM LENS AND IMAGE PICKUP APPARATUS

(71) Applicant: CANON KABUSHIKI KAISHA, Tokyo (JP)

(72) Inventors: Kohei Kimura, Saitama (JP); Takahiro Hatada, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 211 days.

(21) Appl. No.: 16/658,632

(22) Filed: Oct. 21, 2019

(65) Prior Publication Data
US 2020/0132974 A1 Apr. 30, 2020

(30) Foreign Application Priority Data
Oct. 24, 2018 (JP) .............................. JP2018-199790

(51) Int. Cl.
| G02B 15/14 | (2006.01) |
| G02B 15/16 | (2006.01) |
| H04N 5/232 | (2006.01) |

(52) U.S. Cl.
CPC . G02B 15/144113 (2019.08); H04N 5/23296 (2013.01); G02B 15/16 (2013.01)

(58) Field of Classification Search
CPC .... G02B 15/144113; G02B 15/145113; G02B 15/145129; G02B 15/22; G02B 15/16; G02B 15/1461; G02B 15/20
See application file for complete search history.

(56) References Cited

U.S. PATENT DOCUMENTS

| 9,036,265 B2 | 5/2015 | Hatada |
| 9,684,155 B2 | 6/2017 | Hatada |
| 10,120,170 B2 | 11/2018 | Hatada |
| 10,215,972 B2 | 2/2019 | Gyoda et al. |
| 10,222,594 B2 | 3/2019 | Kimura |
| 2008/0068725 A1* | 3/2008 | Chen .................. G02B 15/1461 359/676 |
| 2015/0177498 A1 | 6/2015 | Iwasawa |
| 2016/0091692 A1* | 3/2016 | Hirano ............... G02B 27/0025 359/683 |

(Continued)

FOREIGN PATENT DOCUMENTS

| JP | 2011039560 A | 2/2011 | |
| JP | 2014089300 A * | 5/2014 | ........... G02B 13/009 |
| JP | 2016197257 A | 11/2016 | |

*Primary Examiner* — Alicia M Harrington
(74) *Attorney, Agent, or Firm* — Carter, DeLuca & Farrell LLP

(57) ABSTRACT

Provided is a zoom lens including, in order from an object side to an image side, a positive first lens unit, a negative second lens unit, a positive third lens unit, a positive fourth lens unit and a rear lens group consisting of at least one lens unit. An interval between each pair of adjacent lens units is changed during zooming. The rear lens group includes a negative N-th lens unit configured to move during focusing. The second lens unit and the third lens unit are configured to move during zooming. A focal length of the second lens unit, a focal length of the third lens unit, a focal length of the fourth lens unit, a lateral magnification of the fourth lens unit at a wide angle end and a lateral magnification of the fourth lens unit at a telephoto end are appropriately set.

14 Claims, 11 Drawing Sheets

(56) References Cited

U.S. PATENT DOCUMENTS

| | | | |
|---|---|---|---|
| 2016/0252712 A1* | 9/2016 | Uchida | G02B 15/1461 359/557 |
| 2016/0274342 A1* | 9/2016 | Zhao | G02B 15/173 |
| 2019/0004295 A1 | 1/2019 | Hatada | |
| 2019/0079269 A1 | 3/2019 | Kimura | |

* cited by examiner

ZOOM LENS AND IMAGE PICKUP APPARATUS

BACKGROUND OF THE INVENTION

Field of the Invention

The present invention relates to a zoom lens, which is suitable for an image pickup optical system for use with, for example, a digital still camera, a video camera, a monitoring camera, a broadcasting camera, or other such image pickup apparatus.

Description of the Related Art

In recent years, an image pickup apparatus using an image pickup element has been enhanced in functionality, and has been downsized as an entire apparatus. It is desired that an image pickup optical system for use with the image pickup apparatus be a zoom lens that has a small f-number, a short total length, a small lens barrel diameter, and a high resolution over the entire zoom range. In recent years, it has also been required that, for example, a focusing speed be high, a variation in optical performance be small during focusing, and a change in image magnification be small during focusing.

In recent years, there has been proposed an image pickup optical system of a so-called mirrorless type having a back focus set short and a mechanical member omitted from a segment between the last lens surface and an image plane in order to reduce the total length of the zoom lens and the lens barrel diameter. As a zoom lens short in total length and easy to increase in diameter, there has been known a positive-lead type zoom lens, in which a lens unit having a positive refractive power is arranged closest to an object side.

In US Patent Application Publication No. 2015/0177498, there is disclosed a zoom lens consisting of, in order from an object side to an image side, a first lens unit to a sixth lens unit having positive, negative, positive, negative, positive, and negative refractive powers, respectively, in which an interval between each pair of adjacent lens units is changed during zooming and the fourth lens unit is moved during focusing.

In Japanese Patent Application Laid-Open No. 2011-39560, there is disclosed a zoom lens consisting of, in order from an object side to an image side, a first lens unit to a sixth lens unit having positive, negative, positive, positive, negative, and positive refractive powers, respectively, and an interval between each pair of adjacent lens units is changed during zooming and the second lens unit is moved during focusing.

A zoom lens to be used for an image pickup apparatus is strongly desired to have a predetermined zoom ratio, be compact as an entire lens system, have a small and lightweight focus lens unit, exhibit a small aberration variation during focusing, and have other such properties.

In the positive-lead type zoom lens, in order to reduce the total length of the zoom lens and the lens barrel diameter to obtain high focusing performance, it is required to enhance the refractive power of each of the lens units, and appropriately set the focus lens unit. In particular, an optical design of the focus lens unit exerts a great influence on the lens barrel diameter. Therefore, it is important to reduce a lens diameter of the focus lens unit and a movement amount of the lens unit due to the focusing.

Particularly in a zoom lens having a large aperture ratio, the arrangement setting of the focus lens unit in an optical axis direction is an important factor for determining the outer diameter and the mass of the zoom lens. With the recent increase in demand for moving image photographing, it is also important to set a focus lens unit so as to reduce a variation in image pickup field of view, namely, a variation in so-called image magnification, due to focusing.

When the selection of the focus lens unit is inappropriate, an aberration variation is increased during focusing, and it becomes difficult to obtain satisfactory optical performance over the entire object distance from a long distance to a short distance.

In order to obtain a compact zoom lens having a predetermined zoom ratio, small in aberration variation during focusing, and high optical performance over the entire zoom range, it is important to appropriately set, for example, the number of lens units and refractive powers of the lens units.

SUMMARY OF THE INVENTION

According to the present invention, there is provided a zoom lens including, in order from an object side to an image side: a first lens unit having a positive refractive power; a second lens unit having a negative refractive power; a third lens unit having a positive refractive power; a fourth lens unit having a positive refractive power; and a rear lens group consisting of at least one lens unit, wherein an interval between each pair of adjacent lens units is changed during zooming, wherein the rear lens group includes an N-th lens unit having a negative refractive power, which is configured to move during focusing, wherein the second lens unit and the third lens unit are configured to move during zooming, and wherein the following conditional expressions are satisfied:

$$0.2 < f2^2/(f3 \times f4) < 1.0; \text{ and}$$

$$2.0 < \beta 4t/\beta 4w < 10.0,$$

where f2 represents a focal length of the second lens unit, f3 represents a focal length of the third lens unit, f4 represents a focal length of the fourth lens unit, β4w represents a lateral magnification of the fourth lens unit at a wide angle end, and β4t represents a lateral magnification of the fourth lens unit at a telephoto end.

Further features of the present invention will become apparent from the following description of exemplary embodiments with reference to the attached drawings.

DESCRIPTION OF THE EMBODIMENTS

Now, exemplary embodiments of the present invention are described with reference to the accompanying drawings. A zoom lens according to embodiments of the present invention consist of, in order from an object side to an image side, a first lens unit having a positive refractive power, a second lens unit having a negative refractive power, a third lens unit having a positive refractive power, a fourth lens unit having a positive refractive power, and a rear lens group LR including an N-th lens unit having a negative refractive power. An interval between each pair of adjacent lens units is changed during zooming. The N-th lens unit is configured to move during focusing.

Examples

Figure 1:
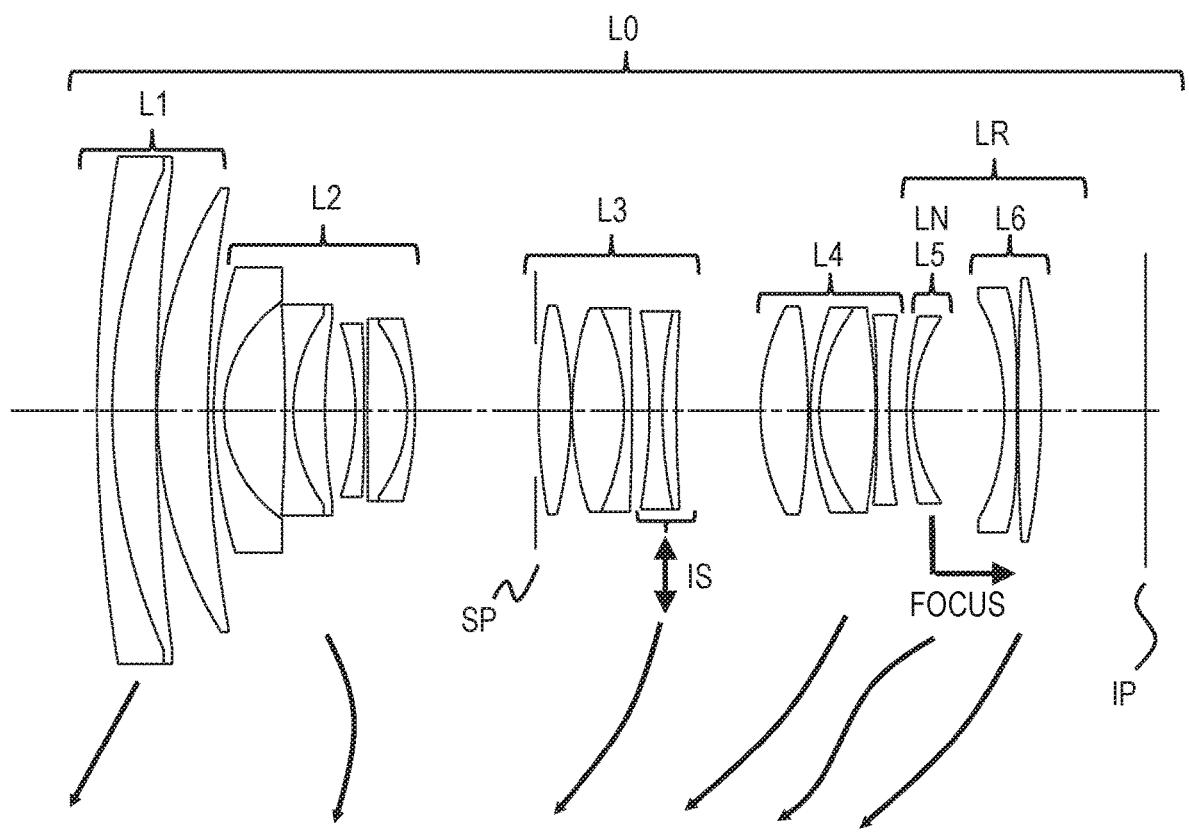
FIG. 1 is a lens cross-sectional view of a zoom lens according to Example 1 of the present invention at a wide angle end.
Figure 2A:
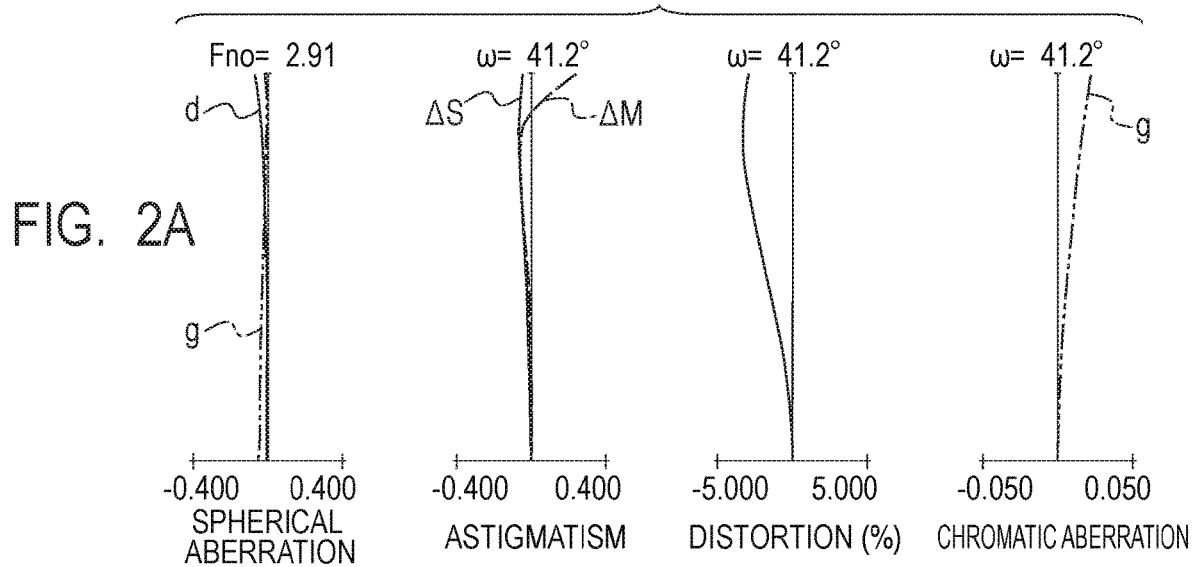
FIG. 2A shows aberration diagrams of the zoom lens according to Example 1 at the wide angle end.
Figure 2B:
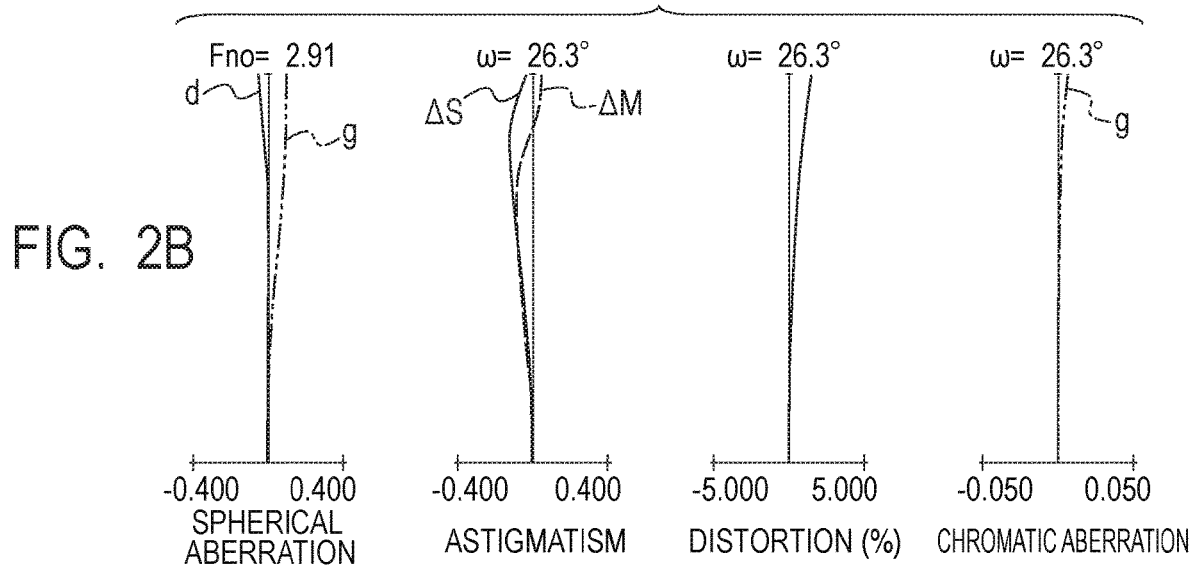
FIG. 2B shows aberration diagrams of the zoom lens according to Example 1 at an intermediate zoom position.
Figure 2C:
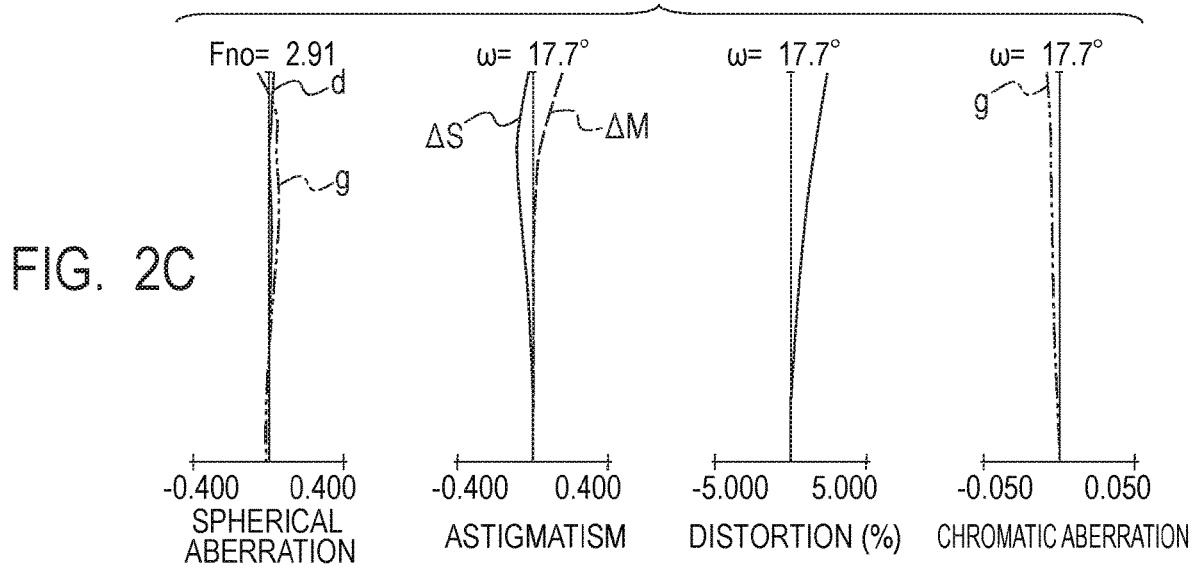
FIG. 2C shows aberration diagrams of the zoom lens according to Example 1 at a telephoto end.

FIG. 1 is a lens cross-sectional view of a zoom lens according to Example 1 of the present invention at a wide angle end (short focal length end). FIG. 2A, FIG. 2B, and FIG. 2C are aberration diagrams of the zoom lens according to Example 1 at the wide angle end, an intermediate zoom position, and a telephoto end (long focal length end), respectively, when the zoom lens is focused at infinity. Example 1 relates to a zoom lens having a zoom ratio of 2.74 and an f-number of 2.91.

Figure 3:
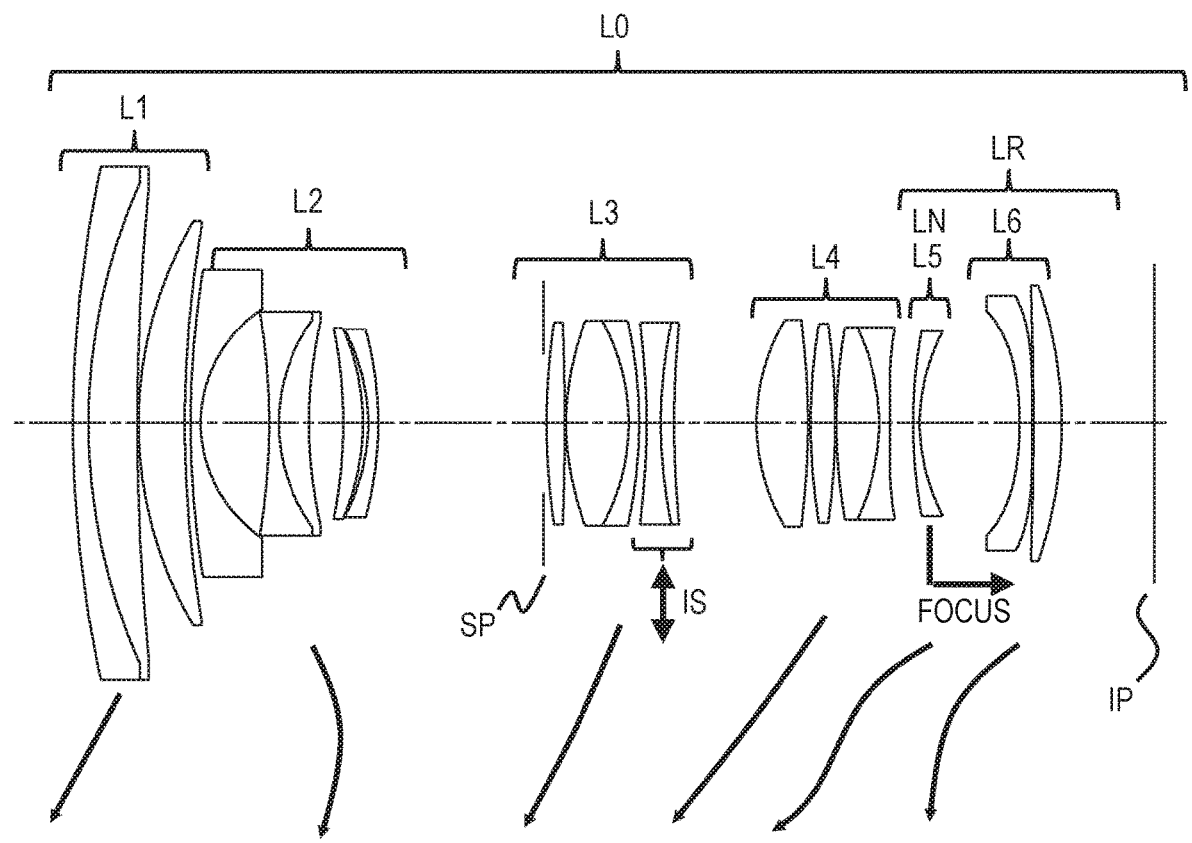
FIG. 3 is a lens cross-sectional view of a zoom lens according to Example 2 of the present invention at a wide angle end.
Figure 4A:
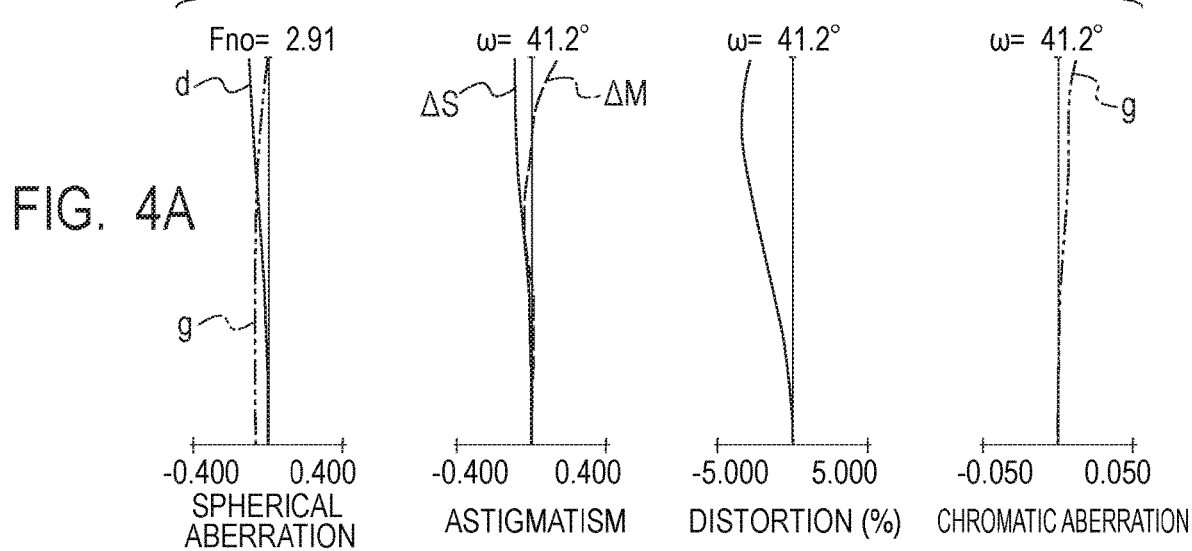
FIG. 4A shows aberration diagrams of the zoom lens according to Example 2 at the wide angle end.
Figure 4B:
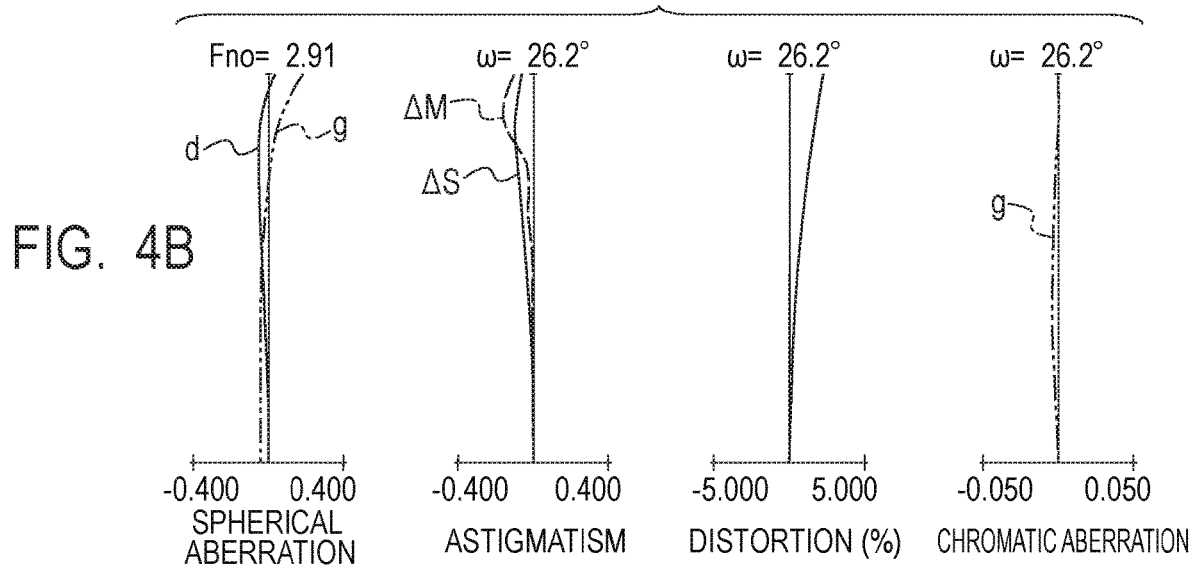
FIG. 4B shows aberration diagrams of the zoom lens according to Example 2 at an intermediate zoom position.
Figure 4C:
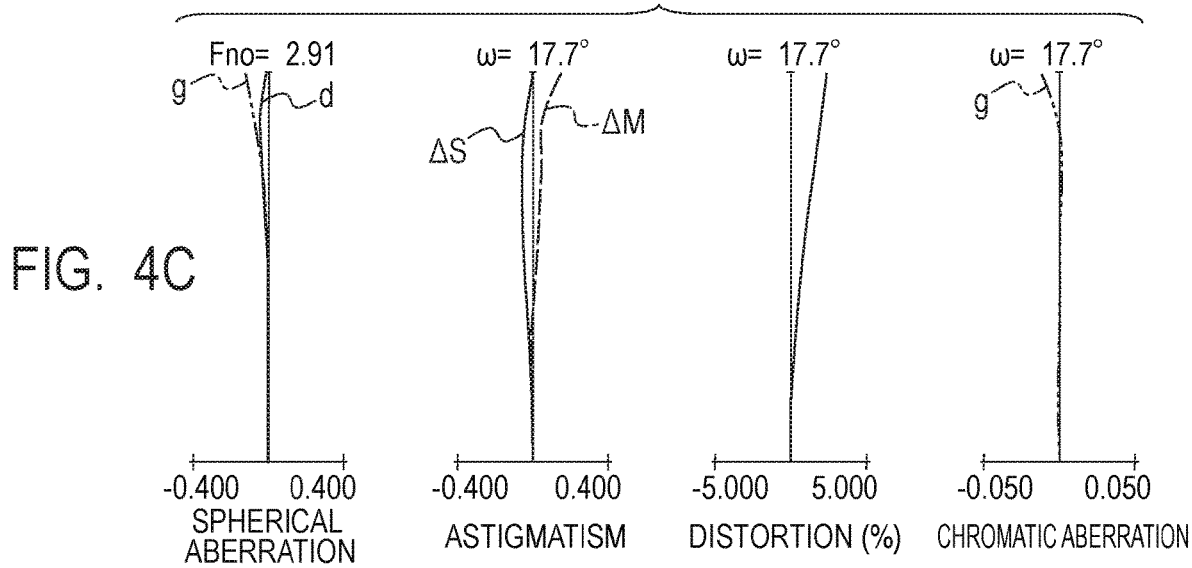
FIG. 4C shows aberration diagrams of the zoom lens according to Example 2 at a telephoto end.

FIG. 3 is a lens cross-sectional view of a zoom lens according to Example 2 of the present invention at a wide angle end. FIG. 4A, FIG. 4B, and FIG. 4C are aberration diagrams of the zoom lens according to Example 2 at the wide angle end, an intermediate zoom position, and a telephoto end, respectively, when the zoom lens is focused at infinity. Example 2 relates to a zoom lens having a zoom ratio of 2.75 and an f-number of 2.91.

Figure 5:
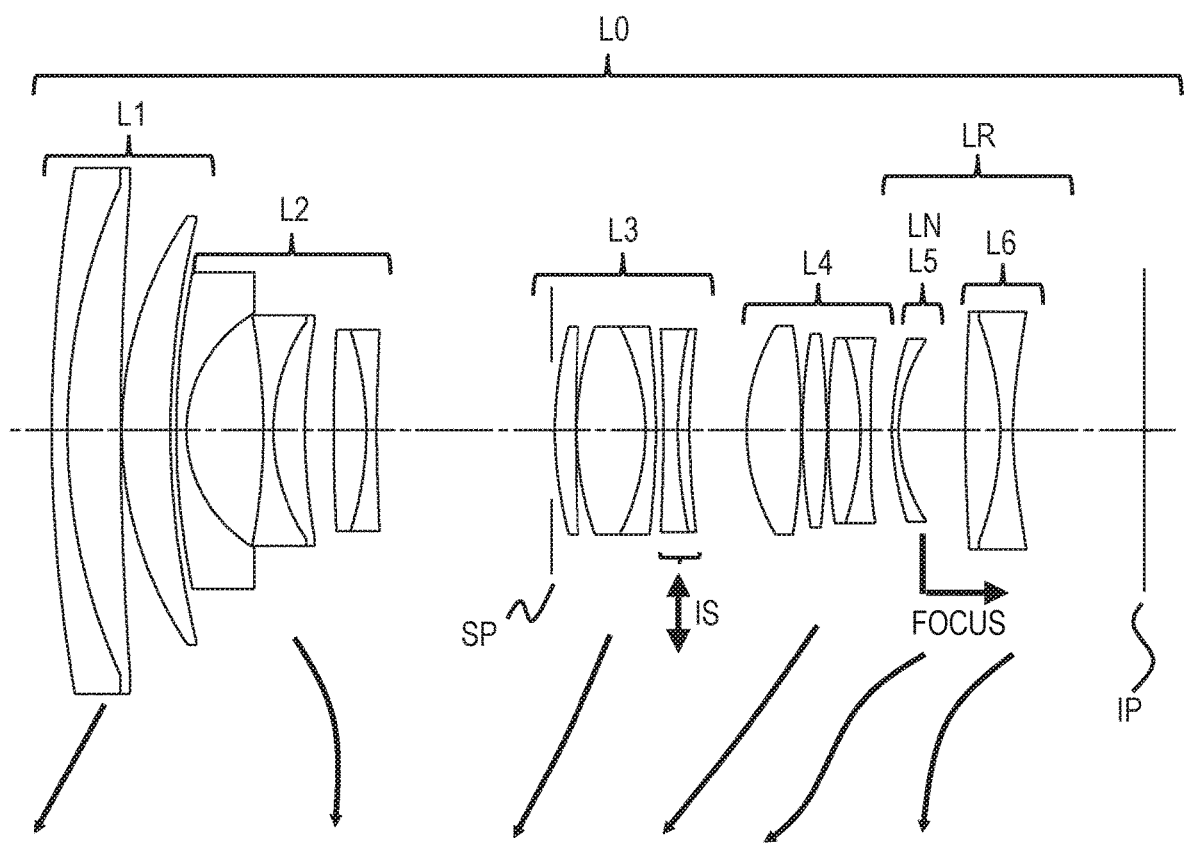
FIG. 5 is a lens cross-sectional view of a zoom lens according to Example 3 of the present invention at a wide angle end.
Figure 6A:
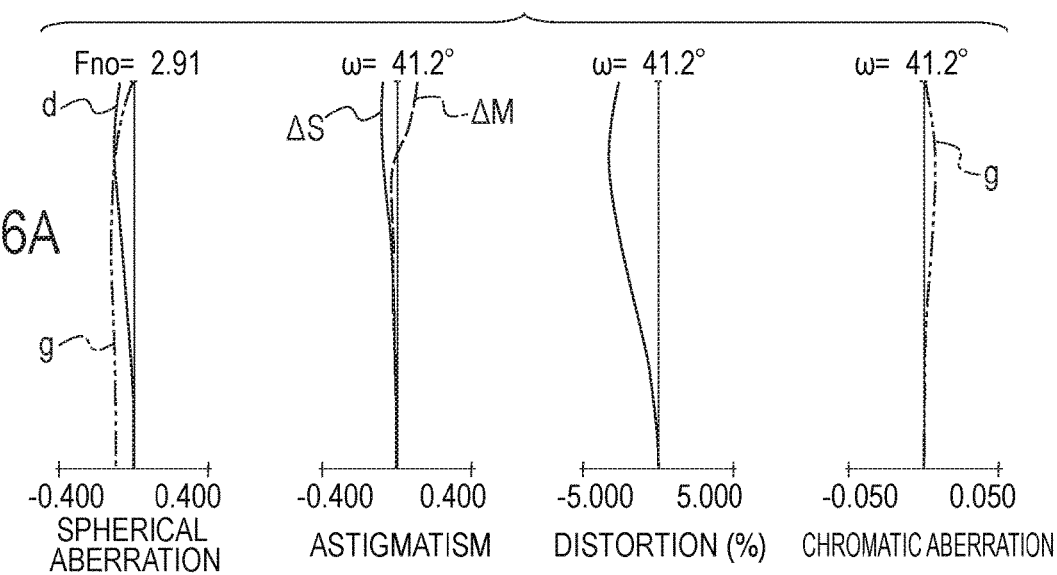
FIG. 6A shows aberration diagrams of the zoom lens according to Example 3 at the wide angle end.
Figure 6B:
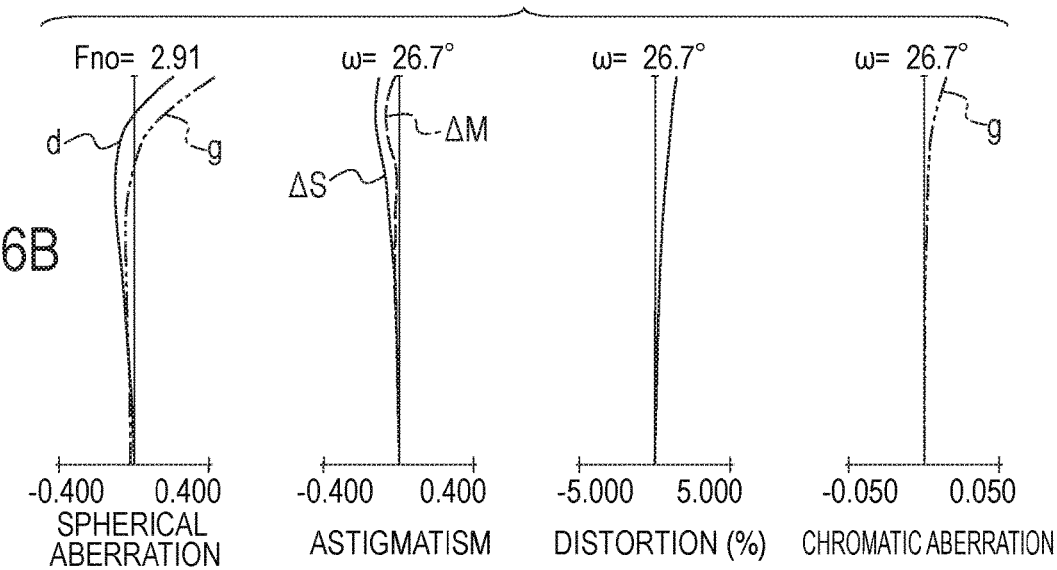
FIG. 6B shows aberration diagrams of the zoom lens according to Example 3 at an intermediate zoom position.
Figure 6C:
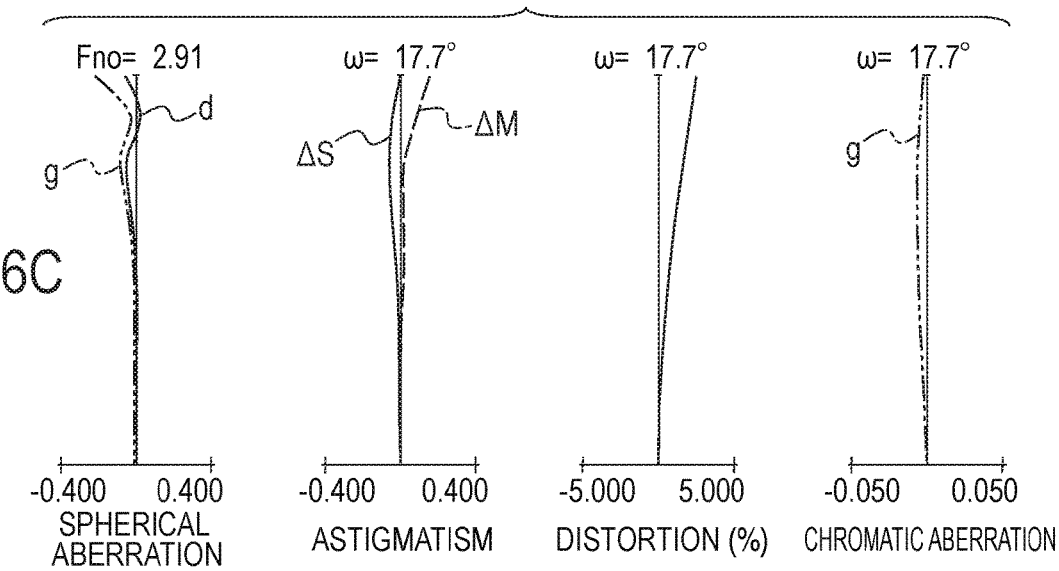
FIG. 6C shows aberration diagrams of the zoom lens according to Example 3 at a telephoto end.

FIG. 5 is a lens cross-sectional view of a zoom lens according to Example 3 of the present invention at a wide angle end. FIG. 6A, FIG. 6B, and FIG. 6C are aberration diagrams of the zoom lens according to Example 3 at the wide angle end, an intermediate zoom position, and a telephoto end, respectively, when the zoom lens is focused at infinity. Example 3 relates to a zoom lens having a zoom ratio of 2.75 and an f-number of 2.91.

Figure 7:
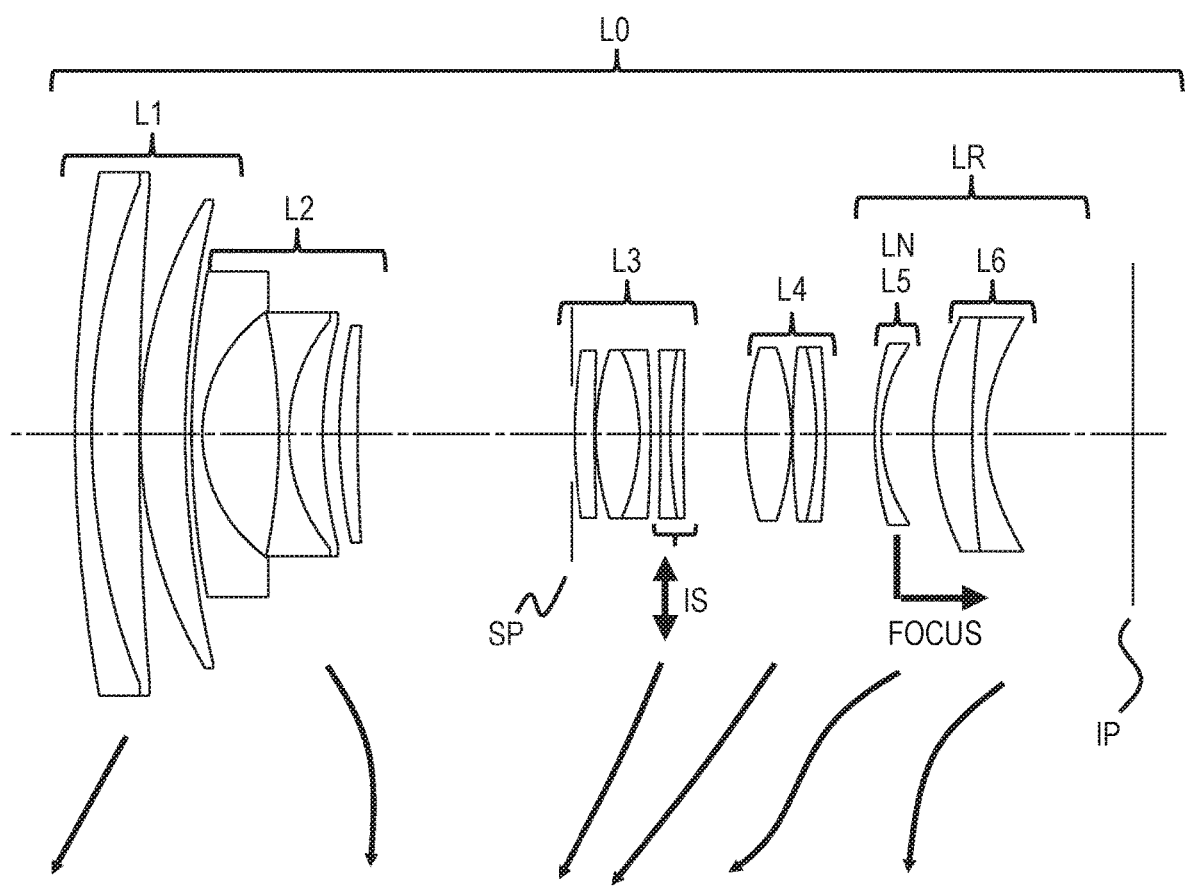
FIG. 7 is a lens cross-sectional view of a zoom lens according to Example 4 of the present invention at a wide angle end.
Figure 8A:
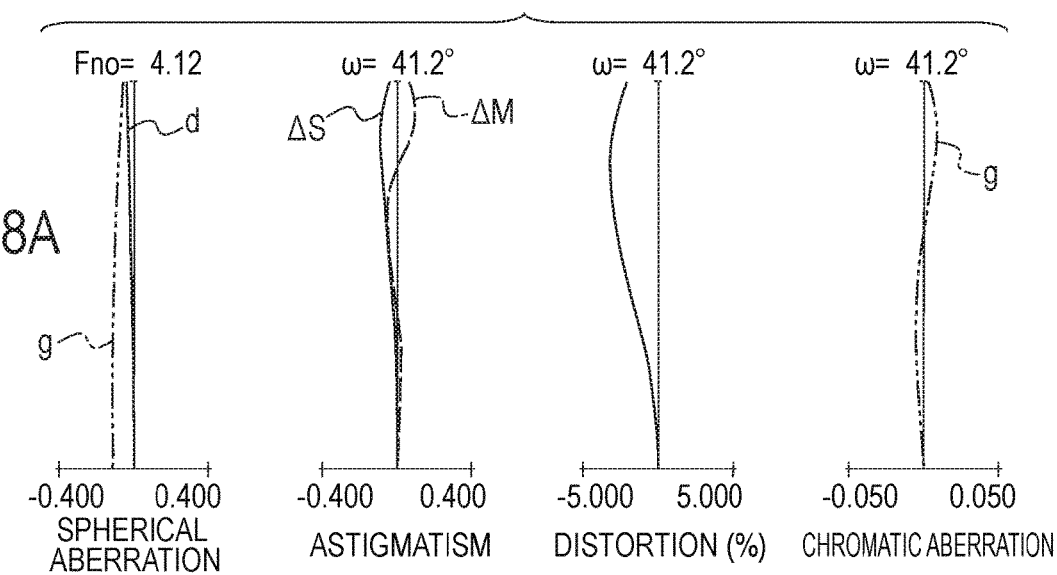
FIG. 8A shows aberration diagrams of the zoom lens according to Example 4 at the wide angle end.
Figure 8B:
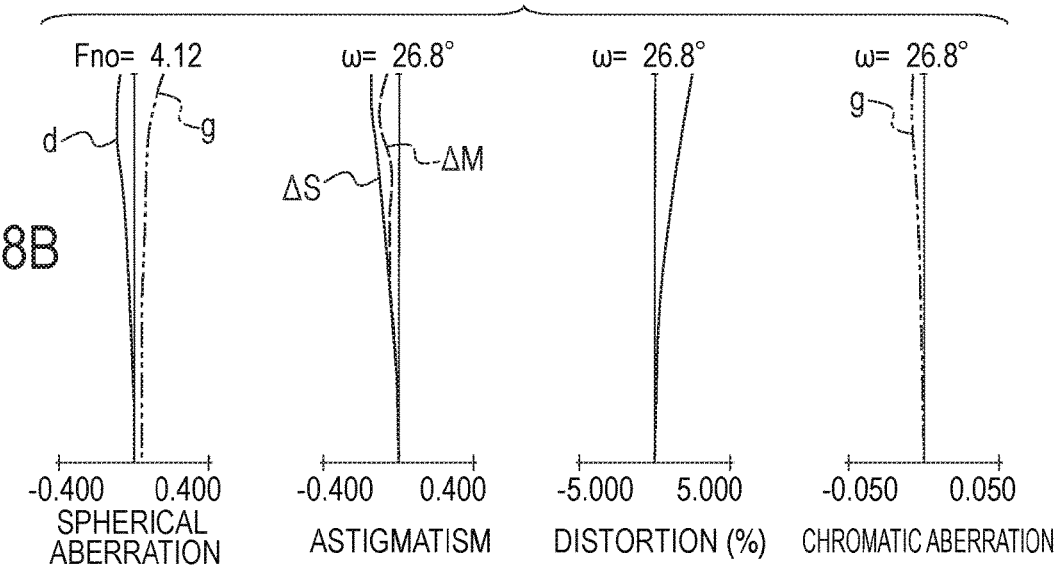
FIG. 8B shows aberration diagrams of the zoom lens according to Example 4 at an intermediate zoom position.
Figure 8C:
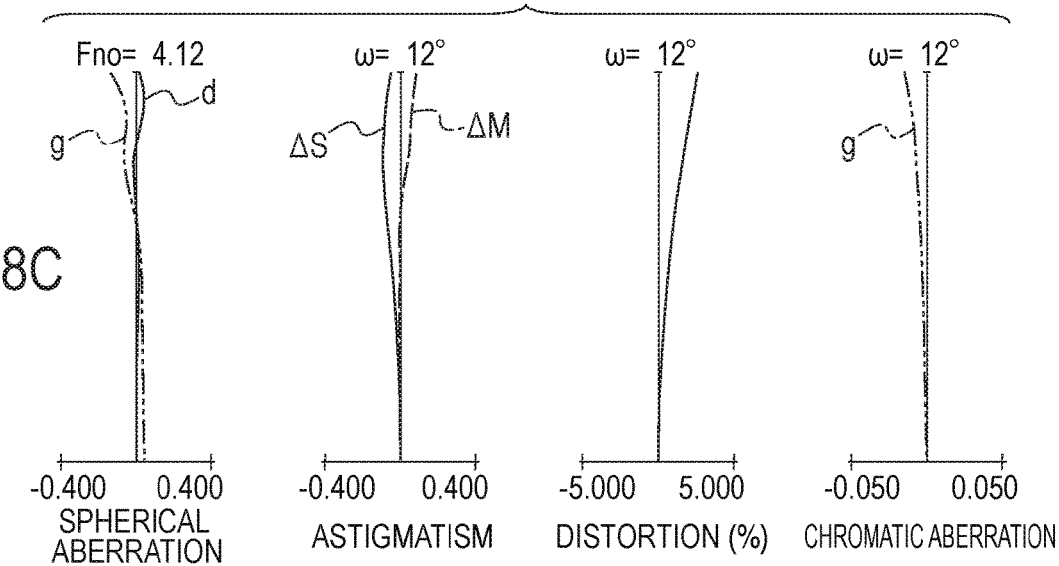
FIG. 8C shows aberration diagrams of the zoom lens according to Example 4 at a telephoto end.

FIG. 7 is a lens cross-sectional view of a zoom lens according to Example 4 of the present invention at a wide angle end. FIG. 8A, FIG. 8B, and FIG. 8C are aberration diagrams of the zoom lens according to Example 4 at the wide angle end, an intermediate zoom position, and a telephoto end, respectively, when the zoom lens is focused at infinity. Example 4 relates to a zoom lens having a zoom ratio of 4.13 and an f-number of 4.12.

Figure 9:
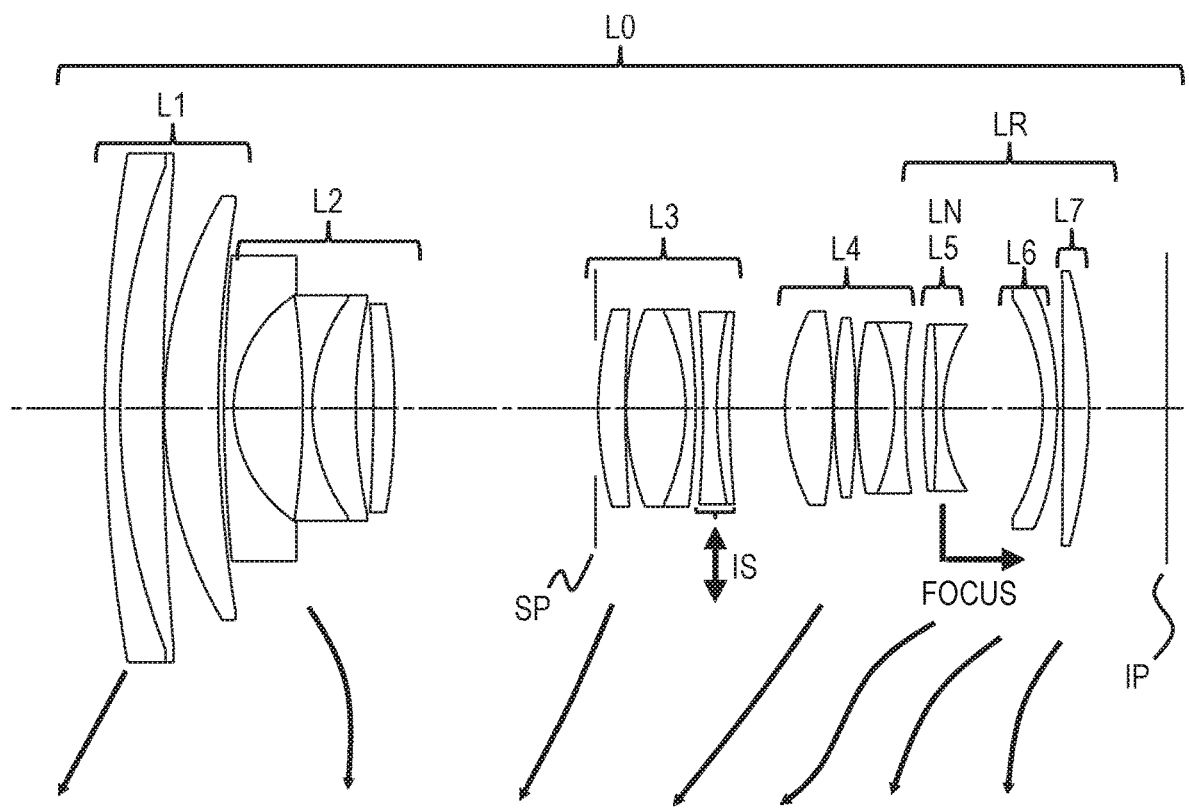
FIG. 9 is a lens cross-sectional view of a zoom lens according to Example 5 of the present invention at a wide angle end.
Figure 10A:
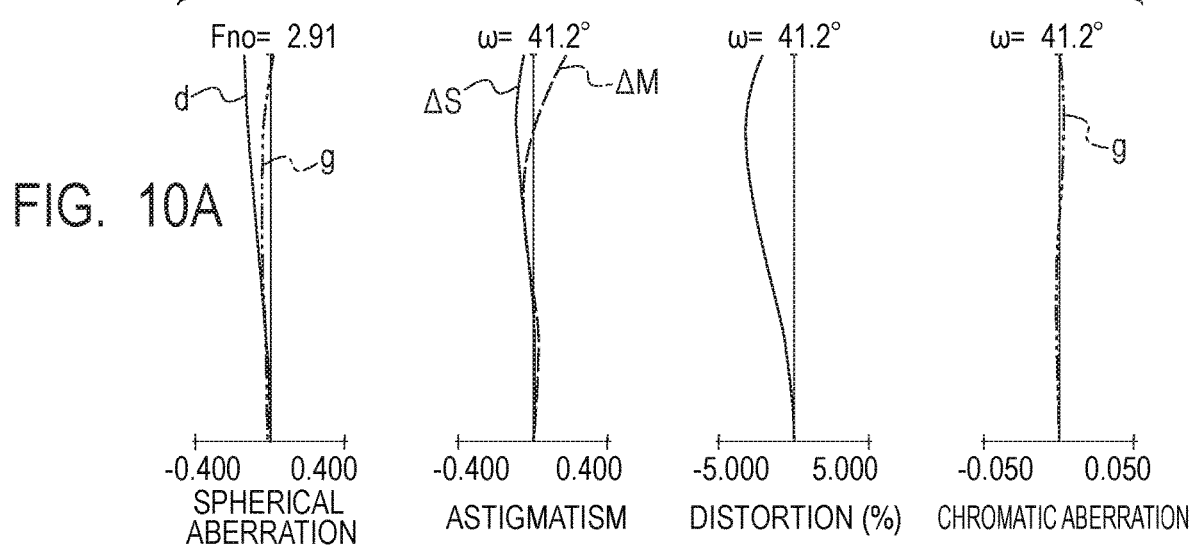
FIG. 10A shows aberration diagrams of the zoom lens according to Example 5 at the wide angle end.
Figure 10B:
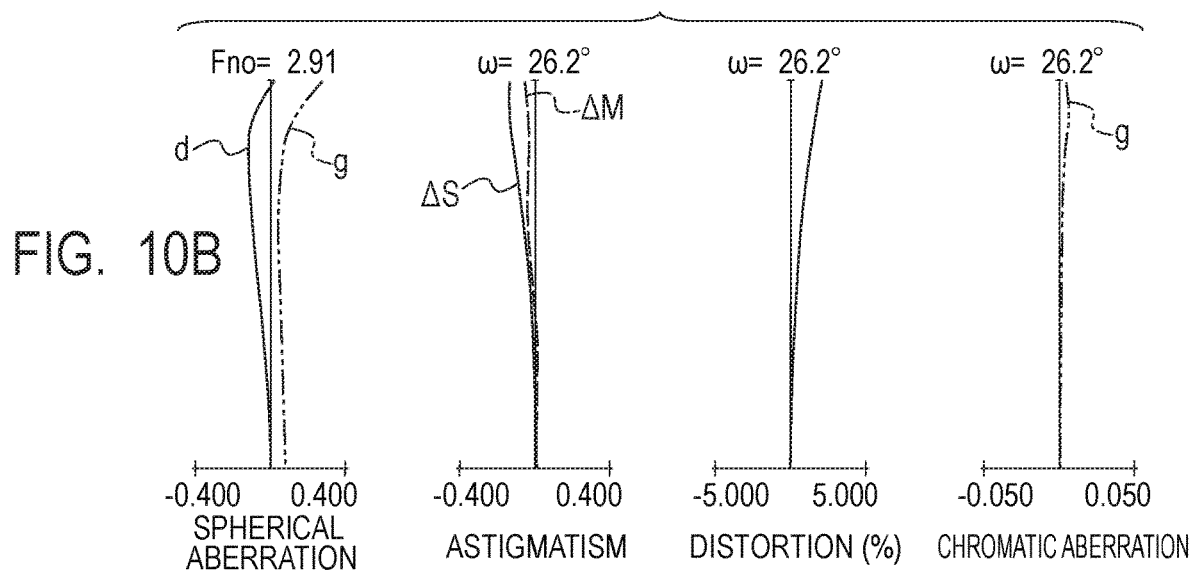
FIG. 10B shows aberration diagrams of the zoom lens according to Example 5 at an intermediate zoom position.
Figure 10C:
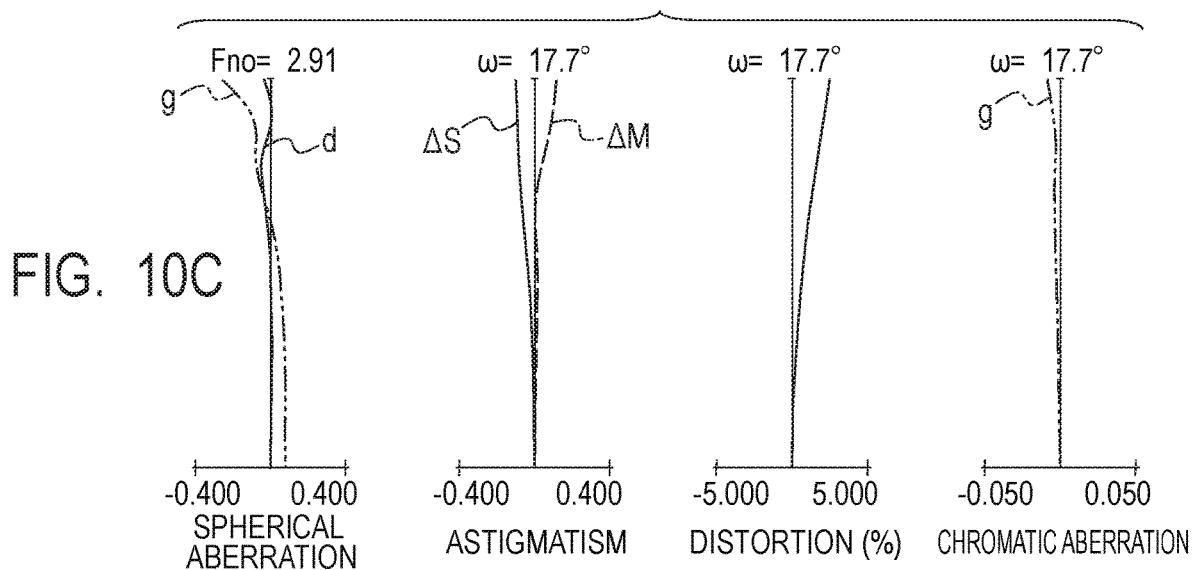
FIG. 10C shows aberration diagrams of the zoom lens according to Example 5 at a telephoto end.
Figure 11:
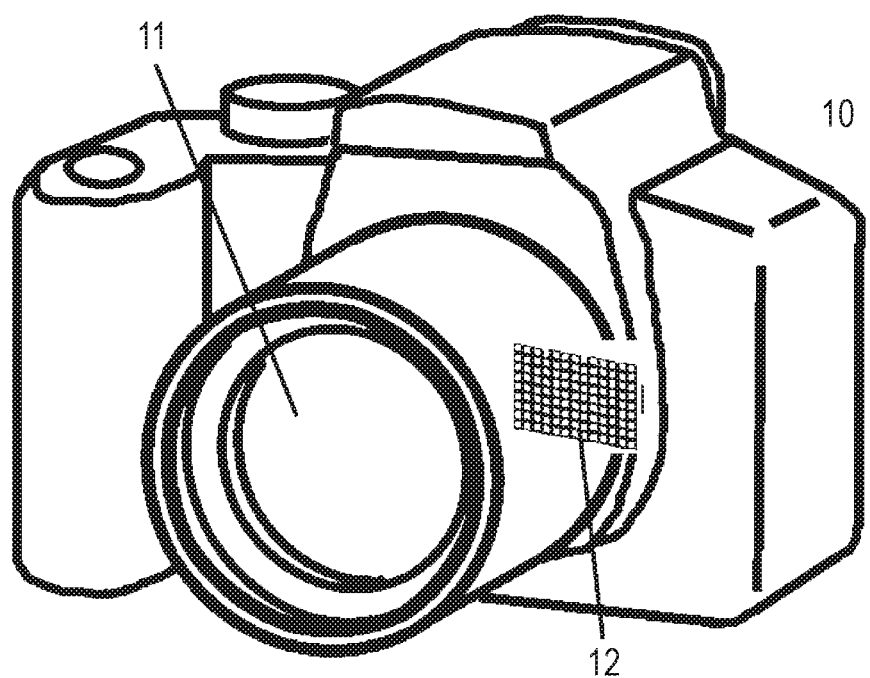
FIG. 11 is a schematic view of a main part of an image pickup apparatus according to an example of the present invention.

FIG. 9 is a lens cross-sectional view of a zoom lens according to Example 5 of the present invention at a wide angle end. FIG. 10A, FIG. 10B, and FIG. 10C are aberration diagrams of the zoom lens according to Example 5 at the wide angle end, an intermediate zoom position, and a telephoto end, respectively, when the zoom lens is focused at infinity. Example 5 relates to a zoom lens having a zoom ratio of 2.75 and an f-number of 2.91. FIG. 11 is a schematic view of a main part of an image pickup apparatus according to the present invention.

The zoom lens according to each of Examples is an image pickup optical system for use with an image pickup apparatus, for example, a video camera, a digital still camera, or a TV camera. The zoom lens according to each of Examples may also be used as a projection optical system for a projection device (projector). In the lens cross-sectional views, the left side is an object side (front side), and the right side is an image side (rear side). Moreover, in the lens cross-sectional views, a zoom lens is denoted by L0. When the position of a lens unit in the order from the object side is represented by "i", the i-th lens unit is denoted by Li. LR is a rear lens group. The rear lens group LR includes a lens unit LN having a negative refractive power.

An aperture stop SP determines (restricts) a light flux at the minimum f-number (Fno). An image stabilizing lens unit IS is also provided. As an image plane IP, an image pickup surface of a solid-state image pickup element (photo-electric conversion element), for example, a CCD sensor or a CMOS sensor, is placed when in use as a photographing optical system of a video camera or a digital still camera. The arrows indicate movement loci of the lens units during zooming from the wide angle end to the telephoto end.

The arrow indicated as "FOCUS" in the drawings indicates a movement direction of a lens unit during focusing from infinity to proximity.

In the aberration diagrams, an f-number is represented by Fno, and a half angle of view (degrees) is represented by "ω", and is an angle of view in ray tracing value. In the spherical aberration diagrams, a solid line "d" indicates a d-line (wavelength: 587.56 nm), a two-dot chain line "g" indicates a g-line (wavelength: 435.835 nm). In the astigmatism diagrams, a solid line ΔS indicates a sagittal image plane with respect to the d-line, and a broken line ΔM indicates a meridional image plane with respect to the d-line. The distortion is depicted for the d-line. In the lateral chromatic aberration diagrams, a two-dot chain line "g" indicates a g-line.

The zoom lens according to each of Examples consists of, in order from the object side to the image side, a first lens unit L1 having a positive refractive power, a second lens unit L2 having a negative refractive power, a third lens unit L3 having a positive refractive power, a fourth lens unit L4 having a positive refractive power, and the rear lens group LR consisting of at least one lens unit. The rear lens group LR includes the N-th lens unit LN having the negative refractive power, which is configured to move during focusing.

With the zoom lens according to each of Examples, the magnification is varied mainly by the movement of the first lens unit L1, the second lens unit L2, the third lens unit L3, and the fourth lens unit L4. The first lens unit L1 is moved toward the object side during zooming to achieve a higher zoom ratio while reducing an effective diameter of a front lens at the wide angle end. Further, the fourth lens unit L4 and the subsequent lens units are moved toward the object side during zooming from the wide angle end to the telephoto end, to thereby obtain a high magnification varying effect. Over an entire zoom range, focusing from infinity to proximity is performed by moving the N-th lens unit LN having the negative refractive power toward the image side as indicated by the arrow.

The zoom lens L0 according to each of Examples consists of the following lens units in order from an object side to an image side: a first lens unit L1 having a positive refractive power; a second lens unit L2 having a negative refractive power; a third lens unit L3 having a positive refractive power; a fourth lens unit L4 having a positive refractive power; and a rear lens group LR including at least one N-th lens unit having a negative refractive power. The N-th lens unit LN is configured to move during focusing.

In the positive-lead type zoom lens, in order to effectively use the back focus to reduce the total length of the zoom lens, the negative refractive power of a lens unit having a negative refractive power, which is arranged on the object side of the aperture stop SP, may be caused to become weaker to some extent. Moreover, the positive refractive power of a lens unit having a positive refractive power, which is arranged on the image side of the aperture stop SP, may be caused to become stronger.

With this configuration, it is further possible to easily ensure satisfactory optical performance over the entire zoom range. Further, with the zoom lens having a large aperture ratio, it is effective to perform focusing by the N-th lens unit on the image side of the aperture stop SP in order to suppress a variation in image magnification during focusing and downsize an entire system of the zoom lens while ensuring satisfactory optical performance at close proximity. This is especially effective with a zoom lens having an aperture ratio (f-number) exceeding 2.8.

Further, when the negative refractive power of the second lens unit L2 serving as a main magnification-varying lens unit is set relatively weak, and the positive refractive powers of the third lens unit and the fourth lens unit are set relatively strong, it is possible to cause the refractive powers to be shared with the N-th lens unit LN for focusing, which is placed on the image side thereof, while maintaining high optical performance. As a result, it becomes easier to maintain satisfactory optical performance during focusing.

Next, the lens configuration in each of Examples is described.

The zoom lens according to Example 1 is a six-unit zoom lens consisting of the following lens units in order from the object side to the image side: a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; and a sixth lens unit L6 having a positive refractive power. The rear lens group LR consists of the fifth lens unit L5 having the negative refractive power and the sixth lens unit L6 having the positive refractive power. Further, the fifth lens unit is the N-th lens unit LN configured to move toward the image side during focusing from infinity to proximity.

During zooming from the wide angle end to the telephoto end, the first lens unit L1 is configured to move in a straight line toward the object side, and the second lens unit L2 is configured to move along a locus that is convex toward the image side. Further, the third lens unit L3 and the fourth lens unit L4 are configured to move toward the object side so that an interval therebetween is reduced. The third lens unit L3 includes an aperture stop SP. Further, two lenses consisting of a negative lens and a positive lens on the image side in the third lens unit L3 are a so-called image stabilizing lens unit configured to compensate for image blur (camera shake) by moving the lenses in a direction having a component perpendicular to an optical axis.

Example 2 is the same as Example 1 in terms of a zoom type including the number of lens units, the sign of the refractive power of each lens unit, and movement conditions for the lens units during zooming. Example 2 is also the same as Example 1 in terms of a focus scheme including the lens units to be moved during focusing and the movement directions.

The zoom lens according to Example 3 is a six-unit zoom lens consisting of the following lens units in order from the object side to the image side: a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; and a sixth lens unit L6 having a negative refractive power. The rear lens group LR consists of the fifth lens unit L5 having the negative refractive power and the sixth lens unit L6 having the negative refractive power. Further, the fifth lens unit L5 is the N-th lens unit LN configured to move toward the image side during focusing from infinity to proximity.

During zooming from the wide angle end to the telephoto end, the first lens unit L1 is configured to move in a straight line toward the object side, and the second lens unit L2 is configured to move along a locus that is convex toward the image side. Further, the third lens unit L3 and the fourth lens unit L4 are configured to move toward the object side so that an interval therebetween is reduced. The third lens unit L3 includes an aperture stop SP. Further, two lenses consisting of a negative lens and a positive lens on the image side in the third lens unit L3 are a so-called image stabilizing lens unit configured to compensate for image blur (camera shake) by moving the lenses in a direction having a component perpendicular to an optical axis.

Example 4 is the same as Example 3 in terms of a zoom type. Example 4 is also the same as Example 3 in terms of a focus scheme including the lens units to be moved during focusing and the movement directions.

The zoom lens according to Example 5 is a seven-unit zoom lens consisting of the following lens units in order from the object side to the image side: a first lens unit L1 having a positive refractive power; a second lens unit L2 having a negative refractive power; a third lens unit L3 having a positive refractive power; a fourth lens unit L4 having a positive refractive power; a fifth lens unit L5 having a negative refractive power; a sixth lens unit L6 having a negative refractive power; and a seventh lens unit L7 having a positive refractive power. The rear lens group LR consists of the fifth lens unit L5 having the negative refractive power, the sixth lens unit L6 having the negative refractive power, and the seventh lens unit L7 having the positive refractive power. Further, the fifth lens unit L5 is the N-th lens unit LN configured to move toward the image side during focusing from infinity to proximity.

During zooming from the wide angle end to the telephoto end, the first lens unit L1 is configured to move in a straight line toward the object side, and the second lens unit L2 is configured to move along a locus that is convex toward the image side. Further, the third lens unit L3 and the fourth lens unit L4 are configured to move toward the object side so that an interval therebetween is reduced. The fifth lens unit L5 to the seventh lens unit L7 are configured to move toward the object side along different loci during zooming. The third lens unit L3 includes an aperture stop SP. Further, two lenses consisting of a negative lens and a positive lens on the image side in the third lens unit L3 are a so-called image stabilizing lens unit configured to compensate for image blur (camera shake) by moving the lenses in a direction having a component perpendicular to an optical axis.

The zoom lens according to each of Examples includes, in order from the object side to the image side, a first lens unit L1 having a positive refractive power, a second lens unit L2 having a negative refractive power, a third lens unit L3 having a positive refractive power, a fourth lens unit L4 having a positive refractive power, and a rear lens group LR consisting of at least one lens unit. Further, an interval between each pair of adjacent lens units is changed. Further, the second lens unit L2 is configured to move during zooming. In the rear lens group LR, the N-th lens unit LN is configured to move during focusing.

When a focal length of the second lens unit L2 is represented by f2, a focal length of the third lens unit L3 is represented by f3, a focal length of the fourth lens unit L4 is represented by f4, a lateral magnification of the fourth lens unit at the wide angle end is represented by β4w, and a lateral magnification of the fourth lens unit L4 at the telephoto end is represented by β4t, the following conditional expressions are satisfied:

$$0.2 < f2^2/(f3 \times f4) < 1.0 \quad (1)$$

$$2.0 \leq \beta 4t/\beta 4w < 10.0 \quad (2)$$

Next, technical meanings of the above-mentioned conditional expressions are described.

In the conditional expression (1), the focal lengths of the second lens unit L2, the third lens unit L3, and the fourth lens unit L4 are set in order to reduce the total length of the zoom lens and a weight of the N-th lens unit LN for focusing.

When the ratio of the conditional expression (1) exceeds the upper limit value of the conditional expression (1), and the negative focal length f2 becomes longer (absolute value of the negative focal length becomes larger), the negative refractive power of the second lens unit L2 becomes too weak, and it becomes difficult to ensure a desired back focus. Further, when the negative refractive power of the second lens unit L2 becomes too weak, a Petzval sum of the entire system of the zoom lens takes a large positive value, and it becomes difficult to correct field curvature and astigmatism. Further, when the ratio of the conditional expression (1) exceeds the upper limit of the conditional expression (1), and the focal length f3 of the third lens unit L3 and the focal length f4 of the fourth lens unit L4 become shorter, the positive refractive power of the third lens unit L3 and the positive refractive power of the fourth lens unit L4 become too strong, and it becomes difficult to correct a variation of an image plane during zooming.

When the ratio of the conditional expression (1) falls below the lower limit value of the conditional expression (1), and the negative focal length f2 becomes shorter (absolute value of the negative focal length becomes smaller), the negative refractive power of the second lens unit L2 becomes too strong, and a light flux diameter at the third lens unit L3 becomes larger. Therefore, especially with a zoom lens having a large aperture ratio, it becomes difficult to correct higher-order spherical aberration at the telephoto end. Further, the negative refractive power of the second lens unit L2 becomes too strong, and the back focus tends to become longer, which is disadvantageous in terms of downsizing the zoom lens.

Further, when the ratio of the conditional expression (1) falls below the lower limit value of the conditional expression (1), and the focal length f3 of the third lens unit L3 and the focal length f4 of the fourth lens unit L4 become longer, the positive refractive power of the third lens unit L3 and the positive refractive power of the fourth lens unit L4 become too weak. Then, movement amounts of the lens units become larger during zooming in order to obtain a desired zoom ratio, which is disadvantageous in terms of reducing the total length of the zoom lens.

In the conditional expression (2), a ratio (so-called share value of magnification varying in zooming) of the lateral magnification β4w at the wide angle end and the lateral magnification β4t at the telephoto end of the fourth lens unit L4 is set in order to reduce a diameter of the N-th lens unit LN for focusing.

When the ratio of the conditional expression (2) exceeds the upper limit value of the conditional expression (2), and a share ratio of magnification varying of the fourth lens unit L4 becomes larger, this is advantageous in reducing the diameter of the N-th lens unit LN, which is a subsequent focus lens unit, but the positive refractive power of the fourth lens unit L4 tends to become too strong. Then, there is a disadvantageous tendency that it becomes difficult to correct spherical aberration and suppress an image plane variation during zooming. Further, the movement amount of the fourth lens unit L4 during zooming becomes larger, which is disadvantageous in terms of reducing the total length of the zoom lens.

When the ratio of the conditional expression (2) falls below the lower limit value of the conditional expression (2), and the share ratio of magnification varying of the fourth lens unit L4 becomes smaller, it becomes difficult to reduce the diameter of the N-th lens unit LN. Further, it is required to increase a share ratio of magnification varying of another lens unit, for example, the third lens unit L3, in order to obtain a desired zoom ratio, which is disadvantageous because it becomes difficult to correct aberrations in the lens units.

In each of Examples, it is preferred to satisfy at least one of conditional expressions provided below.

A focal length of the N-th lens unit LN is represented by "ff", and a focal length of the zoom lens at the wide angle end is represented by "fw". A focal length of the second lens unit L2 is represented by f2. A focal length of the first lens unit L1 is represented by f1. A focal length of the zoom lens at the telephoto end is represented by "ft". The rear lens group LR includes at least one lens unit on the image side of the N-th lens unit LN, and a combined focal length of the at least one lens unit arranged on the image side of the N-th lens unit LN at the wide angle end is represented by "frw", and a distance from a last lens surface to the image plane at the wide angle end is represented by "skw".

A curvature radius of a lens surface closest to the object side in the N-th lens unit LN is represented by Rf1, and a curvature radius of a lens surface closest to the image side in the N-th lens unit LN is represented by Rf2. A lateral magnification of the N-th lens unit LN at the telephoto end is represented by "βft", and a combined lateral magnification of the at least one lens unit arranged on the image side of the N-th lens unit LN at the telephoto end is represented by βrt. A distance on the optical axis from a lens surface closest to the object side to the image plane at the wide angle end is represented by TTDw. A movement amount of the third lens unit L3 and a movement amount of the fourth lens unit L4 during zooming from the wide angle end to the telephoto end are represented by m3 and m4, respectively.

A "movement amount of a lens unit during zooming from the wide angle end to the telephoto end" as used herein refers to a difference between a position on the optical axis of the lens unit at the wide angle end and a position on the optical axis of the lens unit at the telephoto end. The movement amount takes a positive sign when the lens unit is positioned closer to the image side at the telephoto end than at the wide angle end, and a negative sign when the lens unit is positioned closer to the object side at the telephoto end than at the wide angle end.

At this time, it is preferred to satisfy at least one of the following conditional expressions.

$$-5.0 < ff/fw < -1.0 \quad (3)$$

$$-1.5 < f2/fw < -0.5 \quad (4)$$

$$2.0 < f1/fw < 10.0 \quad (5)$$

$$0.1 < f4/ft < 0.7 \quad (6)$$

$$-10.0 < frw/skw < -1.0 \quad (7)$$

$$-7.0 < (Rf2+Rf1)/(Rf2-Rf1) < -0.5 \quad (8)$$

$$-7.0 < (1\beta ft^2) \times \beta rt^2 < -1.0 \quad (9)$$

$$3.0 < TTDw/skw < 20.0 \quad (10)$$

$$0.3 < m3/m4 < 1.0 \quad (11)$$

Next, the technical meaning of each of the conditional expressions given above is described.

In the conditional expression (3), the focal length "ff" of the N-th lens unit LN, which is the focus lens unit, is set in order to downsize and reduce the weight of the zoom lens, and to obtain high focusing performance. When the ratio of the conditional expression (3) exceeds the upper limit value of the conditional expression (3), and the focal length of the N-th lens unit LN becomes shorter, the refractive power of the N-th lens unit LN becomes too strong (absolute value of the negative refractive power becomes too large), and it becomes difficult to obtain satisfactory optical performance over the entire range from infinity to close proximity. Further, the curvature radii of the lens surfaces of the N-th lens unit LN become smaller in order to make the negative refractive power of the N-th lens unit LN stronger, and a mass of the N-th lens unit LN tends to become disadvantageously larger.

Further, the focal length "fw" of the zoom lens at the wide angle end becomes too long, and it becomes disadvantageously difficult to ensure a desired image pickup angle of view. When the ratio of the conditional expression (3) falls below the lower limit value of the conditional expression (3), and the focal length of the N-th lens unit LN becomes longer, the movement amount during focusing becomes larger, and the diameter of the focus lens unit becomes larger. As a result, it becomes disadvantageously difficult to reduce the total length of the zoom lens. Further, the focal length "fw" of the zoom lens at the wide angle end becomes too short, a negative refractive power on the object side of the aperture stop SP for increasing the angle of view becomes stronger, the optical performance is reduced, and further, an effective diameter of a front lens is disadvantageously increased.

The conditional expression (4) is intended to appropriately set the focal length f2 of the second lens unit L2 having a negative refractive power, which serves as a main magnification varying lens unit, and to obtain high optical performance while achieving the reduction in total length of the zoom lens.

When the ratio of the conditional expression (4) falls below the lower limit value of the conditional expression (4) so that the negative focal length f2 of the second lens unit L2 becomes too long, the back focus becomes shorter, but in order to obtain a desired zoom ratio, the movement amount of the second lens unit L2 is increased, and the total length of the zoom lens is increased. Further, the negative refractive power of the entire system of the zoom lens becomes weaker, a Petzval sum tends to become stronger in the positive direction, and an astigmatism and a field curvature are increased. Alternatively, when the focal length "fw" of the zoom lens at the wide angle end becomes shorter, the negative refractive power of the lens unit on the object side of the aperture stop SP for a wider angle of view becomes stronger, the optical performance becomes lower, and the effective diameter of a front lens is further disadvantageously increased.

When the ratio of the conditional expression (4) exceeds the upper limit value of the conditional expression (4) so that the negative focal length f2 of the second lens unit L2 becomes too short, the negative refractive power of the second lens unit L2 becomes too strong, the lens outer diameter of the subsequent third lens unit L3 becomes larger, and it becomes difficult to downsize the zoom lens. Further, when the negative focal length of the second lens unit L2 becomes shorter, in order to reduce the total length of the zoom lens at the wide angle end, it is required to cause the positive refractive powers of the third lens unit L3 and the subsequent lens units to become stronger than required. As a result, spherical aberration or other such aberration on the axis is increased, and it becomes difficult to correct such aberration. Alternatively, the focal length "fw" of the zoom lens at the wide angle end becomes longer, and it becomes difficult to reduce the focal length of the zoom lens at the wide angle end.

The conditional expression (5) defines the focal length "fw" of the zoom lens and the focal length f1 of the first lens unit L1 at the wide angle end in order to obtain a required zoom ratio. When the ratio of the conditional expression (5) exceeds the upper limit value of the conditional expression (5) so that the positive focal length of the first lens unit L1 becomes longer, it becomes easier to correct lateral chromatic aberration at the wide angle end and to correct axial chromatic aberration at the telephoto end. However, the movement amount of the first lens unit L1 becomes larger during zooming, and the total length of the zoom lens is disadvantageously increased.

When the ratio of the conditional expression (5) falls below the lower limit value of the conditional expression (5) so that the positive focal length of the first lens unit L1 becomes shorter, it becomes easier to downsize the zoom lens, but it becomes difficult to satisfactorily correct, for example, spherical aberration and coma with a small number of lenses. Further, when the focal length of the zoom lens at the wide angle end becomes longer, it becomes difficult to ensure a desired zoom ratio.

In the conditional expression (6), the focal length f4 of the fourth lens unit L4 is defined in order to obtain a required zoom ratio and a compact focus lens unit. When the ratio of the conditional expression (6) exceeds the upper limit value of the conditional expression (6), and the focal length of the fourth lens unit L4 becomes longer, the refractive power of the fourth lens unit L4 becomes too weak, an incident light flux width of the subsequent N-th lens unit LN becomes larger, and it becomes disadvantageously difficult to reduce the diameter of the N-th lens unit LN. Further, it is required to secure a long movement amount of the fourth lens unit L4 during zooming in order to obtain a desired zoom magnification, which is disadvantageous in terms of reducing the total length of the zoom lens. Further, the focal length "ft" of the zoom lens at the telephoto end becomes shorter, and it becomes disadvantageously difficult to obtain a desired image pickup field of view at the telephoto end.

When the ratio of the conditional expression (6) falls below the lower limit value of the conditional expression (6), and the focal length of the fourth lens unit L4 becomes shorter, the positive refractive power of the fourth lens unit L4 becomes stronger, which contributes to downsizing of the subsequent N-th lens unit LN, but an amount of aberrations generated in the fourth lens unit L4 becomes larger. In particular, it is required to increase the number of lenses of the fourth lens unit L4 in order to correct spherical aberration, which is disadvantageous in terms of downsizing the zoom lens.

In the conditional expression (7), the combined focal length "frw" of the at least one lens unit on the image side of the N-th lens unit LN at the wide angle end is defined in order to reduce the total length of the zoom lens. When the ratio of the conditional expression (7) falls below the lower limit value of the conditional expression (7), and the negative combined focal length "frw" becomes longer, a negative refractive power on the image side of the N-th lens unit LN becomes too weak. Then, the effect of the telephoto refractive power arrangement of the entire zoom lens at the telephoto end tends to be reduced, which is disadvantageous in terms of reducing the total length of the zoom lens at the telephoto end. Further, the back focus "skw" becomes too short, and a mechanical arrangement of a connection portion between the zoom lens and a camera becomes difficult.

When the ratio of the conditional expression (7) exceeds the upper limit value of the conditional expression (7), and the negative combined focal length "frw" becomes shorter, the negative refractive power on the image side of the N-th lens unit LN becomes too strong, and a refractive power arrangement with which the retrofocus effect of the entire zoom lens at the wide angle end is reduced results, and hence it becomes difficult to reduce the total length of the zoom lens at the wide angle end. Further, a strong negative refractive power is arranged near the image plane, and hence an angle of incidence of a ray on an element, for example, an image pickup element, arranged at the image plane becomes larger, with the result that telecentricity is disadvantageously reduced. Further, the back focus "skw" becomes too long, which is disadvantageous in terms of reducing the total length of the zoom lens.

In the conditional expression (8), shapes of the lens surface on the object side and the lens surface on the image side of the N-th lens unit LN, which is the focus lens unit, are set in order to obtain satisfactory focusing performance at each object distance. When the ratio of the conditional expression (8) exceeds the upper limit value of the conditional expression (8), the shape of the N-th lens unit LN becomes closer to a biconcave shape in which the curvature radii on the object side and the image side become closer to each other. As a result, a variation in spherical aberration during focusing tends to become larger, and it becomes difficult to obtain satisfactory focusing performance.

When the ratio of the conditional expression (8) falls below the lower limit value of the conditional expression (8), the shape of the N-th lens unit LN becomes a strong meniscus shape that is convex toward the object side. As a result, the variation in spherical aberration becomes disadvantageously overcorrected for each object distance. Further, when the shape becomes the strong meniscus shape, a volume of the N-th lens unit LN is increased, which is disadvantageous also in terms of downsizing the zoom lens.

In the conditional expression (9), focus sensitivity (ratio of a movement amount of the image plane with respect to the movement amount of the focus lens unit in an optical axis direction) of the N-th lens unit LN at the telephoto end is appropriately set in order to obtain satisfactory focusing performance at the telephoto end. When the value of the conditional expression (9) exceeds the upper limit value of the conditional expression (9), and negative focus sensitivity becomes lower, variations in aberrations in accordance with the object distance at each object distance tend to be reduced, but the movement amount from infinity to close proximity becomes too large, and the N-th lens unit LN becomes disadvantageously upsized. When the value of the conditional expression (9) falls below the lower limit value of the conditional expression (9), and the negative focus sensitivity becomes higher, fine control of the N-th lens unit LN becomes difficult, with the result that it becomes difficult to obtain satisfactory optical performance.

The conditional expression (10) is a conditional expression in which the total length of the zoom lens and the back focus are appropriately set in order to obtain a zoom lens having a short total length. When the ratio of the conditional expression (10) exceeds the upper limit value of the conditional expression (10), and the total length of the zoom lens at the wide angle end becomes longer, it becomes difficult to reduce the total length of the zoom lens. Further, the back focus "skw" becomes too short, and the mechanical arrangement of the connection portion between the zoom lens and the camera becomes difficult.

When the ratio of the conditional expression (10) falls below the lower limit value of the conditional expression (10), and the total length of the zoom lens at the wide angle end becomes shorter, a positive refractive power of the entire zoom lens becomes too high, and it becomes difficult to control the Petzval sum, and to obtain desired optical performance. Further, the back focus "skw" becomes too long, which is disadvantageous in terms of reducing the total length of the zoom lens.

In the conditional expression (11), a ratio of the movement amount of the third lens unit L3 to the movement amount of the fourth lens unit L4 during zooming is defined in order to maintain satisfactory optical performance over the entire zoom range. When the ratio of the conditional expression (11) exceeds the upper limit value of the conditional expression (11), and the movement amount of the third lens unit L3 becomes longer, the third lens unit L3 and the fourth lens unit L4 are configured to move in directions in which an interval therebetween is increased toward the telephoto end, which is disadvantageous in terms of obtaining a desired zoom ratio.

When the ratio of the conditional expression (11) falls below the lower limit value of the conditional expression (11), and the movement amount of the third lens unit L3 becomes shorter, it becomes easier to control a variation in field curvature during zooming. However, it is required to separate the third lens unit L3 and the fourth lens unit L4 far apart from each other at the wide angle end, and it is disadvantageous in terms of reducing the total length of the zoom lens at the wide angle end.

In each of Examples, it is preferred to set the numerical ranges of the conditional expression (1) to the conditional expression (11) as follows.

$$0.205 < f2^2/(f3 \times f4) < 0.500 \tag{1a}$$

$$2.0 < \beta 4t/\beta 4w < 9.0 \tag{2a}$$

$$-4.0 < ff/fw < -1.3 \tag{3a}$$

$$-1.3 < f2/fw < -0.6 \tag{4a}$$

$$2.8 < f1/fw < 7.0 \tag{5a}$$

$$0.15 < f4/ft < 0.60 \tag{6a}$$

$$-9.0 < frw/skw < -1.2 \tag{7a}$$

$$-7.0 < (Rf2+Rf1)/(Rf2-Rf1) < -1.0 \tag{8a}$$

$$-6.5 < (1-\beta ft^2) \times \beta rt^2 < -2.0 \tag{9a}$$

$$4.0 < TTDw/skw < 17.0 \tag{10a}$$

$$0.4 < m3/m4 < 0.9 \tag{11a}$$

Moreover, in each of Examples, it is further preferred to set the numerical ranges of the conditional expression (1a) to the conditional expression (11a) as follows.

$$0.21 < f2^2/(f3 \times f4) < 0.35 \tag{1b}$$

$$2.35 < \beta 4t/\beta 4w < 8.50 \tag{2b}$$

$$-3.0 < ff/fw < -1.5 \tag{3b}$$

$$-1.2 < f2/fw < -0.7 \tag{4b}$$

$$3.2 < f1/fw < 5.0 \tag{5b}$$

$$0.2 < f4/ft < 0.5 \tag{6b}$$

$$-8.0 < frw/skw < -1.5 \tag{7b}$$

$$-4.5 < (Rf2+Rf1)/(Rf2-Rf1) < -1.5 \tag{8b}$$

$$-6.0 < (1-\beta ft^2) \times \beta rt^2 < -2.5 \tag{9b}$$

$$6.0 < TTDw/skw < 15.0 \tag{10b}$$

$$0.60 < m3/m4 < 0.85 \tag{11b}$$

In each of Examples, it suffices that the N-th lens unit LN serving as a focus lens unit is as lightweight as possible in order to increase the focusing speed. For that reason, it suffices that the N-th lens unit LN consists of a cemented lens consisting of two or less lenses or consists of one negative lens.

Further, in order to obtain a wide angle of view and a high zoom ratio while downsizing the zoom lens, the first lens unit L1 is more preferred to have a smaller number of lenses. With this configuration, a height of incidence of an off-axis light flux passing through the first lens unit L1 becomes smaller, and it is possible to reduce the effective diameter of the first lens unit L1. Therefore, in each of Examples, the first lens unit L1 may be formed of three or less lenses.

Further, in order to achieve a wider angle of view, the second lens unit L2 is preferred to include, in order from the object side to the image side, two negative lenses and one positive lens. With this configuration, the second lens unit L2 is configured to have a negative refractive power, which facilitates a wider angle of view.

Further, according to the present invention, various off-axis aberrations, in particular, astigmatism and distortion, are satisfactorily corrected by appropriately setting the refractive power of the rear lens group LR. Moreover, spherical aberration and coma are effectively corrected in order to achieve a wider angle of view and a higher zoom ratio.

In each of Examples, the components are configured in the above-mentioned manner, to thereby obtain a zoom lens having a short total length, a small lens effective diameter, and high focusing performance.

In each of Examples described above, the zoom lens in which the rear lens group LR consists of two or three lens units has been described as an example, but a range of application of the present invention is not limited thereto. The rear lens group LR may consist of one lens unit that satisfies the features of the N-th lens unit. Alternatively, the rear lens group LR may consist of at least four lens units.

Next, a digital still camera (image pickup apparatus) of an example of the present invention, which uses the zoom lens according to each of Examples of the present invention as an image pickup optical system, is described with reference to FIG. 11.

In FIG. 11, a camera main body 10, and an image pickup optical system 11 formed of the zoom lens of the present invention are illustrated. A solid-state image pickup element (photo-electric conversion element) 12 such as a CCD sensor or a CMOS sensor is included in the camera main body 10, and is configured to receive light of an object image formed by the image pickup optical system 11.

Numerical Data 1 to Numerical Data 5 corresponding to Example 1 to Example 5, respectively, are provided below. In each set of Numerical Data, the position of a surface in the order from the object side is represented by "i". In each set of Numerical Data, a curvature radius of the i-th lens surface in the order from the object side is represented by "ri", a lens thickness and air interval between the i-th lens surface and the (i+1)th lens surface in the order from the object side is represented by "di", and a refractive index and an Abbe number of a material of a lens between the i-th lens surface and the (i+1)th lens surface in the order from the object side are represented by "ndi" and "vdi", respectively. Symbol BF represents the back focus. When an X axis is set in the optical axis direction, an H axis is set in a direction perpendicular to the optical axis, a traveling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1 + \sqrt{1 - (1+K)(H/R)^2}} + A2 \times H^2 +$$

$$A4 \times H^4 + A6 \times H^6 + A8 \times H^8 + A10 \times H^{10} + A12 \times H^{12}$$

In each aspherical coefficient, "e-x" means "$10^{-x}$". Further, an image pickup half angle of view of the zoom lens is provided in addition to the specifications including the focal length and the f-number, and an image height is a maximum image height that determines the image pickup half angle of view. A back focus BF indicates an air-equivalent distance on the optical axis from the last lens surface to the image plane. The total length of the zoom lens indicates a length obtained by adding the back focus to a distance on the optical axis from a first lens surface to the last lens surface. Further, each set of lens unit data indicates lens units and their focal lengths.

In addition, a part in which an interval "d" of each optical surface is "(variable)" is a part in which the interval "d" is changed during zooming, and an interval between surfaces corresponding to the focal length is shown in an annexed table. Results of calculations of the conditional expressions based on lens data in Numerical Data 1 to Numerical Data 5 provided below are shown in Table 1.

Numerical Data 1

Unit: mm
Surface data

| Surface number | r | d | nd | vd |
|---|---|---|---|---|
| 1 | 211.125 | 2.10 | 1.80810 | 22.8 |
| 2 | 80.660 | 6.03 | 1.77250 | 49.6 |
| 3 | 248.854 | 0.15 | | |
| 4 | 57.558 | 6.97 | 1.77250 | 49.6 |
| 5 | 160.440 | (Variable) | | |
| 6 | 66.217 | 1.40 | 1.88300 | 40.8 |
| 7 | 18.113 | 8.41 | | |
| 8 | −206.710 | 1.20 | 1.61800 | 63.4 |
| 9 | 22.688 | 4.36 | 1.85478 | 24.8 |
| 10 | 79.196 | 4.20 | | |
| 11 | −35.317 | 1.20 | 1.58313 | 59.4 |
| 12* | −312.513 | 0.43 | | |
| 13 | 910.041 | 5.47 | 1.59270 | 35.3 |
| 14 | −19.928 | 1.10 | 1.88300 | 40.8 |
| 15 | −47.138 | (Variable) | | |
| 16 (Stop) | ∞ | 0.40 | | |
| 17 | 81.194 | 4.45 | 1.83481 | 42.7 |
| 18 | −54.244 | 0.15 | | |
| 19 | 41.217 | 7.25 | 1.49700 | 81.5 |
| 20 | −32.257 | 1.10 | 2.00069 | 25.5 |
| 21 | −293.896 | 2.41 | | |
| 22* | −71.464 | 1.75 | 1.76802 | 49.2 |
| 23 | 64.990 | 1.91 | 1.80810 | 22.8 |
| 24 | 199.742 | (Variable) | | |
| 25 | 30.855 | 6.56 | 1.59522 | 67.7 |
| 26 | −85.643 | 0.35 | | |
| 27 | 38.493 | 1.20 | 1.73800 | 32.3 |
| 28 | 22.868 | 7.83 | 1.53775 | 74.7 |
| 29 | −71.877 | 0.15 | | |
| 30* | −4,310.465 | 1.70 | 1.85400 | 40.4 |
| 31* | 109.508 | (Variable) | | |
| 32 | 53.194 | 0.90 | 1.80400 | 46.6 |
| 33 | 22.891 | (Variable) | | |
| 34* | −42.821 | 1.70 | 1.58313 | 59.4 |
| 35* | −2,156.781 | 0.15 | | |
| 36 | 344.261 | 3.20 | 2.00100 | 29.1 |
| 37 | −88.670 | (Variable) | | |
| Image plane | ∞ | | | |

Aspherical surface data
Twelfth surface

K = 0.00000e+000  A4 = −5.69442e−006  A6 = −2.29053e−009  A8 = −4.72363e−011
A10 = 4.65343e−013  A12 = −1.99227e−015

Twenty-second surface

K = 0.00000e+000  A4 = 1.87606e−006  A6 = 1.45872e−009  A8 = 2.78338e−011
A10 = −2.10980e−013  A12 = 3.98590e−016

Thirtieth surface

K = 0.00000e+000  A4 = −2.01869e−005  A6 = 6.17344e−008  A8 = −2.64177e−010
A10 = −2.98832e−013  A12 = 2.64092e−015

Thirty-first surface

K = 0.00000e+000  A4 = 1.63774e−006  A6 = 9.32838e−008  A8 = −2.34772e−010
A10 = −7.39973e−013  A12 = 4.51086e−015

Thirty-fourth surface

K = 0.00000e+000  A4 = −2.51719e−005  A6 = 1.25180e−007  A8 = −5.32709e−010
A10 = 5.08044e−013  A12 = 7.30860e−016

-continued

| Thirty-fifth surface |
|---|
| K = 0.00000e+000    A4 = −2.60571e−005    A6 = 1.26402e−007    A8 = −6.23562e−010 |
| A10 = 1.45147e−012    A12 = −1.39940e−015 |

| Various data | | | |
|---|---|---|---|
| Zoom ratio | | 2.74 | |
| | Wide angle | Intermediate | Telephoto |
| Focal length | 24.72 | 43.75 | 67.65 |
| F-number | 2.91 | 2.91 | 2.91 |
| Half angle of view (degrees) | 41.19 | 26.31 | 17.74 |
| Image height | 21.64 | 21.64 | 21.64 |
| Total lens length | 144.34 | 158.19 | 172.04 |
| BF | 14.31 | 25.73 | 35.97 |
| d5 | 0.80 | 17.81 | 28.91 |
| d15 | 16.54 | 8.10 | 2.46 |
| d24 | 11.55 | 5.41 | 3.56 |
| d31 | 2.38 | 1.11 | 0.91 |
| d33 | 12.58 | 13.85 | 14.04 |
| d37 | 14.31 | 25.73 | 35.97 |

| Lens unit data | | |
|---|---|---|
| Unit | First surface | Focal length |
| 1 | 1 | 110.39 |
| 2 | 6 | −18.97 |
| 3 | 16 | 57.70 |
| 4 | 25 | 28.23 |
| 5 | 32 | −50.65 |
| 6 | 34 | 783.07 |

Numerical Data 2

| Unit: mm  Surface data | | | | |
|---|---|---|---|---|
| Surface number | r | d | nd | vd |
| 1 | 161.515 | 2.10 | 1.80809 | 22.8 |
| 2 | 79.872 | 6.59 | 1.77250 | 49.6 |
| 3 | 333.053 | 0.15 | | |
| 4 | 54.361 | 6.22 | 1.72916 | 54.7 |
| 5 | 156.778 | (Variable) | | |
| 6 | 130.015 | 1.35 | 1.88300 | 40.8 |
| 7 | 18.616 | 9.25 | | |
| 8 | −89.388 | 1.30 | 1.53775 | 74.7 |
| 9 | 23.767 | 4.12 | 1.85478 | 24.8 |
| 10 | 60.588 | 4.64 | | |
| 11 | −65.476 | 2.66 | 1.88300 | 40.8 |
| 12 | −32.068 | 0.69 | | |
| 13 | −26.771 | 1.35 | 1.76802 | 49.2 |
| 14* | −50.891 | (Variable) | | |
| 15 (Stop) | ∞ | 0.40 | | |
| 16 | 91.577 | 2.48 | 1.88300 | 40.8 |
| 17 | −304.082 | 0.15 | | |
| 18 | 37.554 | 8.52 | 1.49700 | 81.5 |
| 19 | −28.731 | 1.40 | 1.95375 | 32.3 |
| 20 | −63.707 | 1.02 | | |
| 21* | −96.704 | 1.90 | 1.76802 | 49.2 |
| 22 | 65.000 | 1.78 | 1.90366 | 31.3 |
| 23 | 132.291 | (Variable) | | |
| 24 | 27.626 | 6.95 | 1.49700 | 81.5 |
| 25 | −102.616 | 0.35 | | |
| 26 | 83.438 | 3.31 | 1.59522 | 67.7 |
| 27 | −92.579 | 0.15 | | |
| 28 | 74.322 | 5.83 | 1.53775 | 74.7 |
| 29 | −29.356 | 1.45 | 1.85400 | 40.4 |
| 30* | 10,000.000 | (Variable) | | |
| 31 | 69.619 | 0.88 | 1.95375 | 32.3 |

-continued

| | | | | |
|---|---|---|---|---|
| 32 | 26.524 | (Variable) | | |
| 33* | −44.805 | 1.70 | 1.58313 | 59.4 |
| 34* | −3,044.392 | 0.15 | | |
| 35 | −500.000 | 3.83 | 2.00069 | 25.5 |
| 36 | −56.199 | (Variable) | | |
| Image plane | ∞ | | | |

Aspherical surface data
Fourteenth surface

K = 0.00000e+000    A4 = −3.55372e−006    A6 = −4.44156e−009    A8 = 2.42864e−011
A10 = −2.55074e−013    A12 = 5.39868e−016

Twenty-first surface

K = 0.00000e+000    A4 = 1.70448e−006    A6 = 2.73805e−010    A8 = 3.65782e−011
A10 = −2.55152e−013    A12 = 4.67611e−016

Thirtieth surface

K = 0.00000e+000    A4 = 2.15407e−005    A6 = 3.68704e−010    A8 = 1.79757e−010
A10 = −8.43371e−013    A12 = 2.53994e−015

Thirty-third surface

K = 0.00000e+000    A4 = −3.02830e−005    A6 = 4.59403e−008    A8 = −1.39878e−010
A10 = −1.16192e−012    A12 = 2.72442e−015

Thirty-fourth surface

K = 0.00000e+000    A4 = −3.07871e−005    A6 = 8.23526e−008    A8 = −3.67006e−010
A10 = 5.94084e−013    A12 = −2.60605e−016

Various data

Zoom ratio    2.75

| | Wide angle | Intermediate | Telephoto |
|---|---|---|---|
| Focal length | 24.72 | 44.00 | 67.90 |
| F-number | 2.91 | 2.91 | 2.91 |
| Half angle of view (degrees) | 41.19 | 26.18 | 17.67 |
| Image height | 21.64 | 21.64 | 21.64 |
| Total lens length | 145.95 | 153.27 | 160.58 |
| BF | 12.45 | 26.49 | 31.69 |
| d5 | 0.80 | 14.02 | 22.83 |
| d14 | 22.28 | 9.96 | 2.40 |
| d23 | 11.13 | 5.98 | 3.38 |
| d30 | 3.14 | 1.60 | 1.50 |
| d32 | 13.48 | 12.55 | 16.12 |
| d36 | 12.45 | 26.49 | 31.69 |

Lens unit data

| Unit | First surface | Focal length |
|---|---|---|
| 1 | 1 | 90.00 |
| 2 | 6 | −20.93 |
| 3 | 15 | 68.32 |
| 4 | 24 | 30.32 |
| 5 | 31 | −45.38 |
| 6 | 33 | 267.26 |

Numerical Data 3

Unit: mm
Surface data

| Surface number | r | d | nd | vd |
|---|---|---|---|---|
| 1 | 200.000 | 2.10 | 1.80809 | 22.8 |
| 2 | 79.285 | 7.12 | 1.77250 | 49.6 |
| 3 | 418.295 | 0.15 | | |
| 4 | 51.172 | 6.46 | 1.72916 | 54.7 |
| 5 | 115.687 | (Variable) | | |
| 6 | 104.876 | 1.35 | 1.88300 | 40.8 |
| 7 | 18.183 | 10.29 | | |

-continued

| | | | | |
|---|---|---|---|---|
| 8 | −78.319 | 1.30 | 1.53775 | 74.7 |
| 9 | 25.899 | 4.28 | 1.85478 | 24.8 |
| 10 | 78.908 | 3.85 | | |
| 11 | 245.224 | 4.38 | 1.88300 | 40.8 |
| 12 | −43.197 | 1.35 | 1.76802 | 49.2 |
| 13* | 182.315 | (Variable) | | |
| 14 (Stop) | ∞ | 0.40 | | |
| 15 | 52.693 | 2.82 | 1.88300 | 40.8 |
| 16 | 333.826 | 0.15 | | |
| 17 | 40.931 | 9.18 | 1.49700 | 81.5 |
| 18 | −29.811 | 1.40 | 1.95375 | 32.3 |
| 19 | −115.074 | 1.02 | | |
| 20* | −202.910 | 1.90 | 1.76802 | 49.2 |
| 21 | 65.000 | 1.56 | 1.90366 | 31.3 |
| 22 | 107.749 | (Variable) | | |
| 23 | 27.055 | 7.30 | 1.49700 | 81.5 |
| 24 | −86.200 | 0.15 | | |
| 25 | 78.034 | 3.24 | 1.59522 | 67.7 |
| 26 | −103.467 | 0.15 | | |
| 27 | 84.902 | 4.37 | 1.53775 | 74.7 |
| 28 | −38.525 | 1.45 | 1.85400 | 40.4 |
| 29* | −1,848.701 | (Variable) | | |
| 30 | 37.828 | 0.88 | 1.95375 | 32.3 |
| 31 | 21.967 | (Variable) | | |
| 32 | 218.008 | 4.67 | 1.66680 | 33.0 |
| 33 | −40.214 | 1.70 | 1.55332 | 71.7 |
| 34* | 55.356 | (Variable) | | |
| Image plane | ∞ | | | |

Aspherical surface data
Thirteenth surface

K = 0.00000e+000  A4 = −2.73965e−006  A6 = −1.69162e−009  A8 = −2.49633e−011
A10 = 3.44870e−014  A12 = −9.82913e−017

Twentieth surface

K = 0.00000e+000  A4 = 1.56342e−006  A6 = 4.17422e−009  A8 = 1.65347e−011
A10 = −3.31421e−013  A12 = 8.61220e−016

Twenty-ninth surface

K = 0.00000e+000  A4 = 2.39106e−005  A6 = 2.07325e−008  A8 = 5.03201e−011
A10 = 9.52529e−014  A12 = 4.59360e−016

Thirty-fourth surface

K = 0.00000e+000  A4 = −6.17719e−006  A6 = −4.13751e−009  A8 = −5.99556e−011
A10 = 2.95904e−013  A12 = −5.94251e−016

Various data

| Zoom ratio | | 2.75 | |
|---|---|---|---|
| | Wide angle | Intermediate | Telephoto |
| Focal length | 24.72 | 42.99 | 67.89 |
| F-number | 2.91 | 2.91 | 2.91 |
| Half angle of view (degrees) | 41.19 | 26.72 | 17.67 |
| Image height | 21.64 | 21.64 | 21.64 |
| Total lens length | 145.95 | 154.51 | 163.06 |
| BF | 17.52 | 24.59 | 30.66 |
| d5 | 0.80 | 15.29 | 26.19 |
| d13 | 23.36 | 12.52 | 4.66 |
| d22 | 7.61 | 3.55 | 1.51 |
| d29 | 2.82 | 1.60 | 1.50 |
| d31 | 8.87 | 11.97 | 13.57 |
| d34 | 17.52 | 24.59 | 30.66 |

Lens unit data

| Unit | First surface | Focal length |
|---|---|---|
| 1 | 1 | 100.55 |
| 2 | 6 | −22.21 |
| 3 | 14 | 79.75 |
| 4 | 23 | 28.50 |
| 5 | 30 | −56.46 |
| 6 | 32 | −250.65 |

Numerical Data 4

| | Unit: mm Surface data | | | |
|---|---|---|---|---|
| Surface number | r | d | nd | vd |
| 1 | 180.824 | 2.10 | 1.80809 | 22.8 |
| 2 | 85.891 | 5.95 | 1.77250 | 49.6 |
| 3 | 376.338 | 0.15 | | |
| 4 | 57.750 | 5.66 | 1.72916 | 54.7 |
| 5 | 121.459 | (Variable) | | |
| 6 | 107.116 | 1.35 | 1.88300 | 40.8 |
| 7 | 18.976 | 9.66 | | |
| 8 | −74.468 | 1.30 | 1.53775 | 74.7 |
| 9 | 22.631 | 4.30 | 1.85478 | 24.8 |
| 10 | 52.540 | 2.08 | | |
| 11 | 61.952 | 2.28 | 1.88300 | 40.8 |
| 12 | 205.264 | (Variable) | | |
| 13 (Stop) | ∞ | 0.40 | | |
| 14 | 63.944 | 2.58 | 1.88300 | 40.8 |
| 15 | 242.963 | 0.15 | | |
| 16 | 32.864 | 5.51 | 1.49700 | 81.5 |
| 17 | −26.177 | 1.40 | 1.95375 | 32.3 |
| 18 | −152.899 | 1.26 | | |
| 19* | −254.605 | 1.20 | 1.76802 | 49.2 |
| 20 | 65.000 | 0.00 | | |
| 21 | 65.000 | 1.63 | 1.76182 | 26.5 |
| 22 | 336.267 | (Variable) | | |
| 23 | 35.515 | 5.72 | 1.49700 | 81.5 |
| 24 | −32.768 | 0.15 | | |
| 25 | 92.018 | 3.02 | 1.49700 | 81.5 |
| 26 | −47.866 | 1.20 | 1.85400 | 40.4 |
| 27* | −69.489 | (Variable) | | |
| 28 | 39.516 | 0.88 | 1.95375 | 32.3 |
| 29 | 19.940 | (Variable) | | |
| 30 | 32.993 | 4.92 | 1.69895 | 30.1 |
| 31 | 112.565 | 1.70 | 1.55332 | 71.7 |
| 32* | 21.166 | (Variable) | | |
| Image plane | ∞ | | | |

Aspherical surface data
Nineteenth surface

K = 0.00000e+000  A4 = 8.46983e−007  A6 = −2.67211e−009  A8 = 2.35466e−010
A10 = −2.95314e−012  A12 = 1.05704e−014

Twenty-seventh surface

K = 0.00000e+000  A4 = 2.15030e−005  A6 = −1.26345e−008  A8 = 1.98666e−010
A10 = −1.31987e−012  A12 = 3.82284e−015

Thirty-second surface

K = 0.00000e+000  A4 = −2.40648e−005  A6 = −1.36335e−009  A8 = −6.57029e−011
A10 = 1.11094e−013  A12 = −4.19164e−016

Various data

| Zoom ratio | | 4.13 | |
|---|---|---|---|
| | Wide angle | Intermediate | Telephoto |
| Focal length | 24.72 | 53.96 | 102.00 |
| F-number | 4.12 | 4.12 | 4.12 |
| Half angle of view (degrees) | 41.19 | 21.85 | 11.98 |
| Image height | 21.64 | 21.64 | 21.64 |
| Total lens length | 133.43 | 152.26 | 171.08 |
| BF | 18.51 | 32.77 | 43.74 |
| d5 | 0.80 | 23.06 | 41.96 |
| d12 | 26.96 | 12.42 | 2.40 |
| d22 | 7.90 | 4.36 | 3.25 |
| d27 | 6.20 | 3.16 | 1.50 |
| d29 | 6.51 | 9.93 | 11.69 |
| d32 | 18.51 | 32.77 | 43.74 |

-continued

| Lens unit data | | |
|---|---|---|
| Unit | First surface | Focal length |
| 1 | 1 | 113.35 |
| 2 | 6 | −27.36 |
| 3 | 13 | 95.41 |
| 4 | 23 | 26.70 |
| 5 | 28 | −43.15 |
| 6 | 30 | −250.35 |

Numerical Data 5

| Unit: mm Surface data | | | | |
|---|---|---|---|---|
| Surface number | r | d | nd | vd |
| 1 | 200.000 | 2.10 | 1.80809 | 22.8 |
| 2 | 92.909 | 5.94 | 1.77250 | 49.6 |
| 3 | 369.700 | 0.15 | | |
| 4 | 58.021 | 7.51 | 1.72916 | 54.7 |
| 5 | 167.674 | (Variable) | | |
| 6 | 206.797 | 1.35 | 1.88300 | 40.8 |
| 7 | 18.816 | 9.65 | | |
| 8 | −106.150 | 1.30 | 1.53775 | 74.7 |
| 9 | 25.609 | 6.02 | 1.85478 | 24.8 |
| 10 | 70.006 | 2.45 | | |
| 11 | −221.640 | 2.95 | 1.85400 | 40.4 |
| 12* | −99.731 | (Variable) | | |
| 13 (Stop) | ∞ | 0.40 | | |
| 14 | 49.441 | 3.72 | 1.88300 | 40.8 |
| 15 | 163.827 | 0.15 | | |
| 16 | 37.488 | 8.23 | 1.49700 | 81.5 |
| 17 | −30.900 | 1.40 | 1.95375 | 32.3 |
| 18 | −95.459 | 1.02 | | |
| 19* | −155.610 | 1.90 | 1.76802 | 49.2 |
| 20 | 65.000 | 1.71 | 1.90366 | 31.3 |
| 21 | 123.887 | (Variable) | | |
| 22 | 28.654 | 6.65 | 1.49700 | 81.5 |
| 23 | −77.933 | 0.15 | | |
| 24 | 72.759 | 3.04 | 1.59522 | 67.7 |
| 25 | −105.134 | 0.15 | | |
| 26 | 58.408 | 5.30 | 1.53775 | 74.7 |
| 27 | −29.821 | 1.45 | 1.85400 | 40.4 |
| 28* | 168.702 | (Variable) | | |
| 29 | 100.707 | 1.90 | 1.88300 | 40.8 |
| 30 | −200.000 | 0.90 | 1.72493 | 43.3 |
| 31 | 22.011 | (Variable) | | |
| 32 | −30.000 | 2.00 | 1.58313 | 59.4 |
| 33* | −53.407 | (Variable) | | |
| 34 | −1,263.205 | 3.58 | 2.05090 | 26.9 |
| 35 | −69.134 | (Variable) | | |
| Image plane | ∞ | | | |

Aspherical surface data
Twelfth surface

K = 0.00000e+000   A4 = −3.32723e−006   A6 = −8.11631e−009   A8 = 3.31457e−011
A10 = −2.01651e−013   A12 = 3.05887e−016

Nineteenth surface

K = 0.00000e+000   A4 = 1.51660e−006   A6 = −6.19820e−009   A8 = 1.09651e−010
A10 = −7.26807e−013   A12 = 1.58997e−015

Twenty-eighth surface

K = 0.00000e+000   A4 = 2.27530e−005   A6 = −2.75454e−010   A8 = 5.08670e−010
A10 = −3.58809e−012   A12 = 1.05766e−014

Thirty-third surface

K = 0.00000e+000   A4 = −3.65611e−006   A6 = −7.97771e−009   A8 = −1.77502e−011
A10 = 8.82983e−014   A12 = −3.07075e−016

-continued

| Various data | | | |
|---|---|---|---|
| Zoom ratio | | 2.75 | |
| | Wide angle | Intermediate | Telephoto |
| Focal length | 24.72 | 44.00 | 67.90 |
| F-number | 2.91 | 2.91 | 2.91 |
| Half angle of view (degrees) | 41.19 | 26.18 | 17.67 |
| Image height | 21.64 | 21.64 | 21.64 |
| Total lens length | 147.28 | 154.72 | 162.16 |
| BF | 10.83 | 15.81 | 20.79 |
| d5 | 0.80 | 16.33 | 26.39 |
| d12 | 27.84 | 14.26 | 5.01 |
| d21 | 7.70 | 3.34 | 1.65 |
| d28 | 2.45 | 1.60 | 1.81 |
| d31 | 13.79 | 17.76 | 18.44 |
| d33 | 0.80 | 2.55 | 5.00 |
| d35 | 10.83 | 15.81 | 20.79 |

| Lens unit data | | |
|---|---|---|
| Unit | First surface | Focal length |
| 1 | 1 | 100.55 |
| 2 | 6 | −23.82 |
| 3 | 13 | 73.64 |
| 4 | 22 | 30.68 |
| 5 | 29 | −43.61 |
| 6 | 32 | −121.20 |
| 7 | 34 | 69.49 |

TABLE 1

| | Conditional Expression | Numerical Example 1 | Numerical Example 2 | Numerical Example 3 | Numerical Example 4 | Numerical Example 5 |
|---|---|---|---|---|---|---|
| Conditional Expression (1) | $0.2 < f2^2/(f3 \times f4) < 1.0$ | 0.221 | 0.211 | 0.217 | 0.294 | 0.251 |
| Conditional Expression (2) | $2.0 < \beta 4t/\beta 4w < 10.0$ | 2.981 | 5.617 | 2.399 | 2.050 | 8.376 |
| Conditional Expression (3) | $-5.0 < ff/fw < -1.0$ | −2.049 | −1.836 | −2.284 | −1.746 | −1.764 |
| Conditional Expression (4) | $-1.5 < f2/fw < -0.5$ | −0.768 | −0.847 | −0.898 | −1.107 | −0.964 |
| Conditional Expression (5) | $2.0 < f1/fw < 10.0$ | 4.466 | 3.641 | 4.067 | 4.585 | 4.067 |
| Conditional Expression (6) | $0.1 < f4/ft < 0.7$ | 0.417 | 0.447 | 0.420 | 0.262 | 0.452 |
| Conditional Expression (7) | $-10.0 < frw/skw < -1.0$ | −4.004 | −5.012 | −2.500 | −1.787 | −7.402 |
| Conditional Expression (8) | $-7.0 < (Rf2 + Rf1)/(Rf2 - Rf1) < -0.5$ | −2.511 | −2.231 | −3.770 | −3.037 | −1.559 |
| Conditional Expression (9) | $-7.0 < (1 - \beta ft^2)\beta rt^2 < -1.0$ | −3.001 | −3.059 | −2.732 | −5.522 | −2.772 |
| Conditional Expression (10) | $3.0 < TTDw/skw < 20.0$ | 10.088 | 11.722 | 8.331 | 7.208 | 13.594 |
| Conditional Expression (11) | $0.3 < m3/m4 < 1.0$ | 0.631 | 0.617 | 0.676 | 0.819 | 0.690 |

According to the present invention, there is provided the zoom lens having the short total length and a small lens effective diameter, with which high optical performance can be obtained easily over the entire zoom range and the entire object distance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-199790, filed Oct. 24, 2018, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power;
a fourth lens unit having a positive refractive power; and
a rear lens group consisting of at least one lens unit,
wherein an interval between each pair of adjacent lens units is changed during zooming,
wherein the rear lens group includes an N-th lens unit having a negative refractive power, which is configured to move during focusing,
wherein the second lens unit and the third lens unit are configured to move during zooming, and
wherein the following conditional expressions are satisfied:

$$0.2 < f2^2/(f3 \times f4) < 1.0;$$

$$2.0 < \beta 4t/\beta 4w < 10.0; \text{ and}$$

$$0.3 < m3/m4 < 1.0,$$

where f2 represents a focal length of the second lens unit, f3 represents a focal length of the third lens unit, f4 represents a focal length of the fourth lens unit, β4w represents a lateral magnification of the fourth lens unit at a wide angle end, β4t represents a lateral magnification of the fourth lens unit at a telephoto end, m3 represents a movement amount of the third lens unit during zooming from the wide angle end to the telephoto end, and m4 represents a movement amount of the fourth lens unit during zooming from the wide angle end to the telephoto end.

2. The zoom lens according to claim 1, wherein the following conditional expression is satisfied:

$$-5.0 < ff/fw < -1.0,$$

where ff represents a focal length of the N-th lens unit, and fw represents a focal length of the zoom lens at the wide angle end.

3. The zoom lens according to claim 1, wherein the following conditional expression is satisfied:

$$-1.5 < f2/fw < -0.5,$$

where f2 represents a focal length of the second lens unit, and fw represents a focal length of the zoom lens at the wide angle end.

4. The zoom lens according to claim 1, wherein the following conditional expression is satisfied:

$$2.0 < f1/fw < 10.0,$$

where f1 represents a focal length of the first lens unit, and fw represents a focal length of the zoom lens at the wide angle end.

5. The zoom lens according to claim 1, wherein the following conditional expression is satisfied:

$$0.1 < f4/ft < 0.7,$$

where ft represents a focal length of the zoom lens at the telephoto end.

6. The zoom lens according to claim 1,
wherein the rear lens group includes at least one lens unit arranged on the image side of the N-th lens unit, and
wherein the following conditional expression is satisfied:

$$-10.0 < frw/skw < -1.0,$$

where frw represents a combined focal length of the at least one lens unit arranged on the image side of the N-th lens unit at the wide angle end, and skw represents a distance on an optical axis from a last lens surface to an image plane at the wide angle end.

7. The zoom lens according to claim 1, wherein the following conditional expression is satisfied:

$$-7.0 < (Rf2+Rf1)/(Rf2-Rf1) < -0.5,$$

where Rf1 represents a curvature radius of a lens surface closest to the object side in the N-th lens unit, and Rf2 represents a curvature radius of a lens surface closest to the image side in the N-th lens unit.

8. The zoom lens according to claim 1, wherein the following conditional expression is satisfied:

$$-7.0 < (1-\beta ft^2) \times \beta rt^2 < -1.0,$$

where βft represents a lateral magnification of the N-th lens unit at the telephoto end, and βrt represents a combined lateral magnification of a lens unit arranged on the image side of the N-th lens unit at the telephoto end.

9. The zoom lens according to claim 1, wherein the following conditional expression is satisfied:

$$3.0 < TTDw/skw < 20.0,$$

where skw represents a distance from a last lens surface to an image plane at the wide angle end, and TTDw represents a distance on an optical axis from a lens surface closest to the object side to the image plane at the wide angle end.

10. The zoom lens according to claim 1, wherein the N-th lens unit consists of two or less lenses.

11. The zoom lens according to claim 1, wherein the rear lens group consists of:
a fifth lens unit, which is the N-th lens unit; and
a sixth lens unit having a positive refractive power, which is arranged on the image side of the fifth lens unit.

12. The zoom lens according to claim 1, wherein the rear lens group consists of:
a fifth lens unit, which is the N-th lens unit; and
a sixth lens unit having a negative refractive power, which is arranged on the image side of the fifth lens unit.

13. The zoom lens according to claim 1, wherein the rear lens group consists of, in order from the object side to the image side:
a fifth lens unit, which is the N-th lens unit;
a sixth lens unit having a negative refractive power; and
a seventh lens unit having a positive refractive power.

14. An image pickup apparatus comprising:
a zoom lens; and
an image pickup element configured to receive light of an image formed by the zoom lens,
wherein the zoom lens includes, in order from an object side to an image side:
a first lens unit having a positive refractive power;
a second lens unit having a negative refractive power;
a third lens unit having a positive refractive power;
a fourth lens unit having a positive refractive power; and
a rear lens group consisting of at least one lens unit,
wherein an interval between each pair of adjacent lens units is changed during zooming,
wherein the rear lens group includes an N-th lens unit having a negative refractive power, which is configured to move during focusing,
wherein the second lens unit and the third lens unit are configured to move during zooming, and
wherein the following conditional expressions are satisfied:

$$0.2 < f2^2/(f3 \times f4) < 1.0;$$

$$2.0 < \beta 4t/\beta 4w < 10.0; \text{ and}$$

$$0.3 < m3/m4 < 1.0,$$

where f2 represents a focal length of the second lens unit, f3 represents a focal length of the third lens unit, f4 represents a focal length of the fourth lens unit, β4w represents a lateral magnification of the fourth lens unit at a wide angle end, β4t represents a lateral magnification of the fourth lens unit at a telephoto end, m3 represents a movement amount of the third lens unit during zooming from the wide angle end to the telephoto end, and m4 represents a movement amount of the fourth lens unit during zooming from the wide angle end to the telephoto end.

* * * * *